US008578320B2

(12) United States Patent (10) Patent No.: US 8,578,320 B2
Liu (45) Date of Patent: Nov. 5, 2013

(54) AUTOMATIC DESIGN SUPPORT APPARATUS AND METHOD

(75) Inventor: Yu Liu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 13/036,738

(22) Filed: Feb. 28, 2011

(65) Prior Publication Data

US 2011/0219348 A1 Sep. 8, 2011

(30) Foreign Application Priority Data

Mar. 2, 2010 (JP) ................................. 2010-045007

(51) Int. Cl.
 *G06F 9/455* (2006.01)
 *G06F 17/50* (2006.01)
(52) U.S. Cl.
 USPC ............................ 716/132; 716/133; 716/134
(58) Field of Classification Search
 USPC ........................................................ 716/132
 See application file for complete search history.

(56) References Cited

U.S. PATENT DOCUMENTS

| 6,968,517 | B2 | 11/2005 | McConaghy | |
|---|---|---|---|---|
| 2002/0037596 | A1 | 3/2002 | Yamaguchi | |
| 2003/0066034 | A1 | 4/2003 | Gross et al. | |
| 2005/0257178 | A1* | 11/2005 | Daems et al. | 716/2 |
| 2008/0022239 | A1* | 1/2008 | McConaghy et al. | 716/4 |
| 2009/0182695 | A1 | 7/2009 | Yanami et al. | |

FOREIGN PATENT DOCUMENTS

| JP | 4-260973 | 9/1992 |
|---|---|---|
| JP | 6-139303 | 5/1994 |
| JP | 6-348683 | 12/1994 |
| JP | 7-66294 | 3/1995 |
| JP | 2004-61372 | 2/2004 |
| JP | 2004-118719 | 4/2004 |
| JP | 2004-145410 | 5/2004 |
| JP | 2005-55960 | 3/2005 |
| JP | 2005-70849 | 3/2005 |
| JP | 2006-293483 | 10/2006 |
| JP | 2007-144979 | 6/2007 |
| JP | 2007-148650 | 6/2007 |
| WO | 2006/017247 A2 | 2/2006 |
| WO | 2006/039165 A2 | 4/2006 |

OTHER PUBLICATIONS

Tiwary, Saurabh K; Tiwary, Pragati K; Rutenbar, Rob A; Generation of Yield-Aware Pareto Surfaces for Hierarchical Circuit Design Space Exploration, Jul. 24, 2006, ACM.*

(Continued)

*Primary Examiner* — Vuthe Siek
*Assistant Examiner* — Eric Lee
(74) *Attorney, Agent, or Firm* — Staas & Halsey LLP

(57) ABSTRACT

Design variable value sets for predetermined design variables are generated, and for each of the predetermined design variables, parameter value sets for predetermined parameters are generated. For each combination of them, circuit simulation is carried out to obtain a performance item value set for predetermined performance items. Then, for each of the design variable value sets, and further for each of the parameter value sets generated for a corresponding design variable value set, combinations of the design variable value set and parameter value set are identified, for which performance item values for all of the predetermined performance items are not less than performance item values obtained for a combination of the corresponding design variable value set and a corresponding parameter value set, and a yield rate is calculated by dividing the number of identified combinations by the number of parameter value sets generated for the corresponding design variable value set.

7 Claims, 26 Drawing Sheets

(56) References Cited

OTHER PUBLICATIONS

Aravind Seshadri, "NSGA—II: A Multi-Objective Optimization Algorithm," Mar. 19, 2006, 13pp, <http://www.mathworks.com/matlabcentral/fileexchange/10429>.

R. Fletcher, "Practical Methods of Optimization," John Wiley & Sons, May 2009, 8pp.

Saurabh K. Tiwary et al., "Generation of Yield-Aware Pareto Surfaces for Hierarchical Circuit Design Space Exploration," MARCO/DARPA Center for Circuits & Systems Solutions (C2S2) and the Pittsburgh Technology Collaborative, Jul. 2006, pp. 31-36.

Guo Yu et al., "Yield Aware Analog Integrated Circuit Optimization Using Geostatistics Motivated Performance Modeling," IEEE, Sep. 10, 2009, pp. 464-469.

Japanese Office Action issued Sep. 25, 2012 in corresponding Japanese Patent Application No. 2009-120305.

Yasunori Katsurayama et al., "On the Portfolio Selection Model Applying to Historical Data", Japan Industrial Management Association, vol. 46, No. 5, 1995, pp. 395-400.

\* cited by examiner

| PVT PARAMERTER | DISTRIBUTION DATA |
|---|---|
| Leff | GAUSS, $\mu_{11}, \sigma_{11}$ |
| Vth | GAUSS, $\mu_{12}, \sigma_{12}$ |
| Tox | GAUSS, $\mu_{13}, \sigma_{13}$ |
| PolyCD | GAUSS, $\mu_{14}, \sigma_{14}$ |
| rshncd | GAUSS, $\mu_{15}, \sigma_{15}$ |
| rshpcd | GAUSS, $\mu_{16}, \sigma_{16}$ |
| ⋮ | ⋮ |
| V | UNIFORM, $L_1, U_1$ |
| T | UNIFORM, $L_2, U_2$ |

FIG.5A

| DESIGN VARIABLE | RANGE |
|---|---|
| DESIGN VARIABLE 1 | LL1-UU1 |
| DESIGN VARIABLE 2 | LL2-UU2 |
| DESIGN VARIABLE 3 | LL3-UU3 |
| DESIGN VARIABLE 4 | LL4-UU4 |
|  |  |
| ⋮ | ⋮ |

FIG.5B

| DESIGN ID | DESIGN INSTANCE ID | CIRCUIT CONFIGURATION | DESIGN VARIABLE 1 | DESIGN VARIABLE 2 | ... | PVT PARAMERTER 1 | PVT PARAMERTER 2 | ... |
|---|---|---|---|---|---|---|---|---|
| D1 | 001 | CIRCUIT 1 | ZA1 | ZB1 | | PVT11 | PVT21 | |
| D1 | 002 | CIRCUIT 1 | ZA1 | ZB1 | | PVT12 | PVT22 | |
| D1 | 003 | CIRCUIT 1 | ZA1 | ZB1 | | PVT13 | PVT23 | |
| D1 | 004 | CIRCUIT 1 | ZA1 | ZB1 | | PVT14 | PVT24 | |
| D1 | 005 | CIRCUIT 1 | ZA1 | ZB1 | | PVT15 | PVT25 | |
| ... | | | | ... | | ... | ... | |
| D2 | 001 | CIRCUIT 1 | ZA2 | ZB2 | | PVT16 | PVT26 | |
| D2 | 002 | CIRCUIT 1 | ZA2 | ZB2 | | PVT17 | PVT27 | |
| D2 | 003 | CIRCUIT 1 | ZA2 | ZB2 | | PVT18 | PVT28 | |
| D2 | 004 | CIRCUIT 1 | ZA2 | ZB2 | | PVT19 | PVT29 | |
| D2 | 005 | CIRCUIT 1 | ZA2 | ZB2 | | PVT20 | PVT30 | |
| ... | | | | ... | | ... | ... | |

FIG.6

| DESIGN ID | DESIGN INSTANCE ID | CIRCUIT CONFIGURATION | DESIGN VARIABLE 1 | ... | PVT PARAMERTER 1 | ... | PERFORMANCE ITEM 1 | PERFORMANCE ITEM 2 | ... |
|---|---|---|---|---|---|---|---|---|---|
| D1 | 001 | CIRCUIT 1 | ZA1 | | PVT11 | | A1 | B1 | |
| D1 | 002 | CIRCUIT 1 | ZA1 | | PVT12 | | A2 | B2 | |
| D1 | 003 | CIRCUIT 1 | ZA1 | | PVT13 | | A3 | B3 | |
| D1 | 004 | CIRCUIT 1 | ZA1 | | PVT14 | | A4 | B4 | |
| D1 | 005 | CIRCUIT 1 | ZA1 | | PVT15 | | A5 | B5 | |
| ... | | ... | ... | | ... | | ... | ... | |
| D2 | 001 | CIRCUIT 1 | ZA2 | | PVT16 | | A6 | B6 | |
| D2 | 002 | CIRCUIT 1 | ZA2 | | PVT17 | | A7 | B7 | |
| D2 | 003 | CIRCUIT 1 | ZA2 | | PVT18 | | A8 | B8 | |
| D2 | 004 | CIRCUIT 1 | ZA2 | | PVT19 | | A9 | B9 | |
| D2 | 005 | CIRCUIT 1 | ZA2 | | PVT20 | | A10 | B10 | |
| ... | | ... | ... | | ... | | ... | ... | |

FIG.8

| DESIGN ID | DESIGN INSTANCE ID | CIRCUIT CONFIGURATION | DESIGN VARIABLE 1 | ... | PVT PARAMERTER 1 | ... | PERFORMANCE ITEM 1 | ... | YIELD |
|---|---|---|---|---|---|---|---|---|---|
| D1 | 001 | CIRCUIT 1 | ZA1 | | PVT11 | | A1 | | Y1 |
| D1 | 002 | CIRCUIT 1 | ZA1 | | PVT12 | | A2 | | Y2 |
| D1 | 003 | CIRCUIT 1 | ZA1 | | PVT13 | | A3 | | Y3 |
| D1 | 004 | CIRCUIT 1 | ZA1 | | PVT14 | | A4 | | Y4 |
| D1 | 005 | CIRCUIT 1 | ZA1 | | PVT15 | | A5 | | Y5 |
| ... | | ... | | | ... | | ... | | ... |
| D2 | 001 | CIRCUIT 1 | ZA2 | | PVT16 | | A6 | | Y6 |
| D2 | 002 | CIRCUIT 1 | ZA2 | | PVT17 | | A7 | | Y7 |
| D2 | 003 | CIRCUIT 1 | ZA2 | | PVT18 | | A8 | | Y8 |
| D2 | 004 | CIRCUIT 1 | ZA2 | | PVT19 | | A9 | | Y9 |
| D2 | 005 | CIRCUIT 1 | ZA2 | | PVT20 | | A10 | | Y10 |
| ... | | ... | | | ... | | ... | | ... |

FIG.11

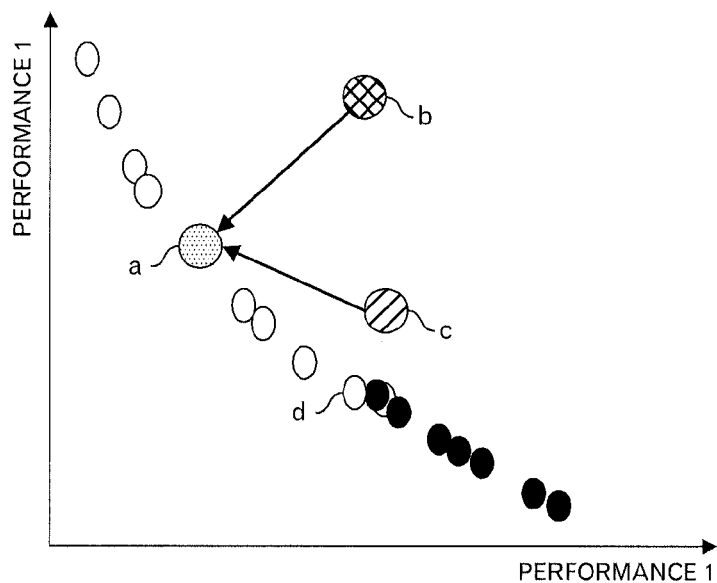
FIG.20
| RANK | ORDER | DESIGN ID |
|---|---|---|
| 0 | 1 | D1 |
|   | 2 | D2 |
| 1 | 1 | D3 |
|   | 2 | D4 |
| 2 | 1 | D5 |
FIG.21
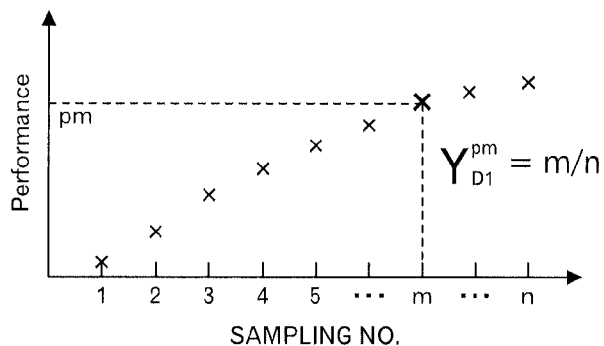
FIG.22

| DESIGN ID | DESIGN INSTANCE ID | CIRCUIT CONFIGURATION | DESIGN VARIABLE 1 | ... | PVT PARAMERTER 1 | ... | PERFORMANCE ITEM 1 | ... | YIELD |
|---|---|---|---|---|---|---|---|---|---|
| D1 | 001 | CIRCUIT 1 | ZA1 | | PVT11 | | A1 | | Y1 |
| D1 | 002 | CIRCUIT 1 | ZA1 | | PVT12 | | A2 | | Y2 |
| D9 | 0019 | CIRCUIT 1 | ZA2 | | PVT19 | | A9 | | Y19 |
| D10 | 0020 | CIRCUIT 1 | ZA2 | | PVT20 | | A10 | | Y20 |
| ... | | | | | ... | | ... | | ... |

FIG.26

| DESIGN ID | DESIGN INSTANCE ID | CIRCUIT CONFIGURATION | DESIGN VARIABLE 1 | ... | PVT PARAMERTER 1 | ... | PERFORMANCE ITEM 1 | ... | YIELD |
|---|---|---|---|---|---|---|---|---|---|
| D101 | 001 | CIRCUIT 1 | ZA1 | | PVT11 | | A1 | | Y1 |
| D101 | 002 | CIRCUIT 1 | ZA1 | | PVT12 | | A2 | | Y2 |
| D209 | 001 | CIRCUIT 2 | ZA2 | | PVT19 | | A9 | | Y209 |
| D210 | 005 | CIRCUIT 2 | ZA2 | | PVT20 | | A10 | | Y210 |
| ... | | | | | ... | | ... | | ... |

FIG.27

| PERFORMANCE ITEM | REQUIREMENT |
|---|---|
| CONSUMED CURRENT | ≦5mA |
| THD (Total harmonic distortion) | ≦−40dB |
| DC GAIN | −3dB∼2dB |
| BANDWIDTH | ≧1GHz |
| YIELD RATE | 80% |

AUTOMATIC DESIGN SUPPORT APPARATUS AND METHOD

CROSS-REFERENCE TO RELATED APPLICATIONS

This application is based upon and claims the benefit of priority of the prior Japanese Patent Application No. 2010-045007, filed on Mar. 2, 2010, the entire contents of which are incorporated herein by reference.

FIELD

This technique relates to an automatic circuit design support technique.

BACKGROUND

With the increase of the operation speed of analog circuits, minute components are often used in a semiconductor chip. However, the minute components have a problem that the fluctuation of its performance is large. Because this fluctuation influences the yield of the semiconductor chip, it is desired to improve the yield by conducting appropriate design of the semiconductor chip in addition to improvement of the manufacturing process. However, typically, because there is an antinomy between the yield and the performance, it is preferable that the circuit design is carried out while appropriately evaluating the yield and performance.

On the other hand, as for methods for conducting automatic circuit design, multiobjective optimization and single objective optimization are used. The multiobjective optimization is a method for calculating a set (i.e. pareto curve or surface in a solution space) of solutions (i.e. non-dominated solution) that is not dominated by other solutions in the solution space. The pareto curve or surface will be explained in detail later. On the other hand, the single objective optimization is a method for searching the design space for a point whose value of a predetermined evaluation function becomes minimum. In the single objective optimization, when any solution to realize the requirement specification cannot be obtained, the optimization processing is carried out again after changing the requirement specification. Hence, the efficiency is poor. In addition, when an initial value is not proper, a lot of searches in the design space are carried out in the single objective optimization. On the other hand, the processing amount of the multiobjective optimization typically becomes large because a set of non-dominated solutions is calculated. However, once the non-dominated solutions are generated, the processing amount after that becomes little. This is an advantage.

Incidentally, an example that the multiobjective optimization is applied to the design of the analog circuits already exists. In addition, a conventional art that the yield is considered also exists, and in this conventional art, by fixing the influence of PVT (i.e. Process, Voltage and Temperature) variations to the performance, the fixed yield rate is assumed as depicted in FIG. 1, and the pareto curve at that time is generated. FIG. 1 depicts pareto curves for the yields 20%, 50% and 80% in the performance space of the performances frequency bandwidth and gain, and the pareto curves are calculated while fixing the yield rates. In such a method, because the respective rates are individually set to generate the pareto curves, the efficiency of the processing is poor. In addition, because the pareto curve is generated for each yield rate, any relationship between the yield and performance for each design.

In other words, it is impossible for the conventional arts to appropriately evaluate the relationship between the yield and performance.

SUMMARY

This automatic design support method includes: (A) extracting a circuit configuration having a specific function from a circuit configuration data storage device storing data of a plurality of circuit configurations; (B) generating, according to a setting, a plurality of design variable value sets for predetermined design variables, generating, for each of the plurality of design variable value sets, a plurality of parameter value sets for parameters for which change is assumed due to manufacturing or environment, and storing generated data into a data storage unit; (C) for each combination of one of the plurality of design variable value sets and one of the plurality of parameter value sets, which are stored in the data storage unit, causing a simulator to carry out a circuit simulation for the extracted circuit configuration, obtaining, as a simulation result, a performance item value set for predetermined performance items, and storing the simulation result into the data storage unit; and (D) for each of the plurality of design variable value sets, and further for each of the plurality of parameter value sets, which are generated for a corresponding design variable value set, identifying combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding design variable value set and the yield rate as coordinate values of a point in a performance yield space into a performance yield space data storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5A is a diagram depicting an example of data stored in a PVT parameter storage unit;

FIG. 5B is a diagram depicting an example of data stored in a design variable data storage unit;

FIG. 6 is a diagram depicting an example of data stored in a simulation result data storage unit;

FIG. 8 is a diagram depicting an example of data stored in a simulation result data storage unit;

FIG. 11 is a diagram depicting an example of data stored in a YP space data storage unit;

FIG. 20 is a diagram to explain the domination relationship and pareto in the performance space;

FIG. 21 is a diagram depicting an example of data stored in a sorting result data storage unit;

FIG. 22 is a diagram depicting an example of Monte-Carlo simulation;

FIG. 26 is a diagram depicting an example of data stored in a pareto data storage unit;

FIG. 27 is a diagram depicting an example of data stored in the pareto data storage unit;

DESCRIPTION OF EMBODIMENTS

Figure 2:
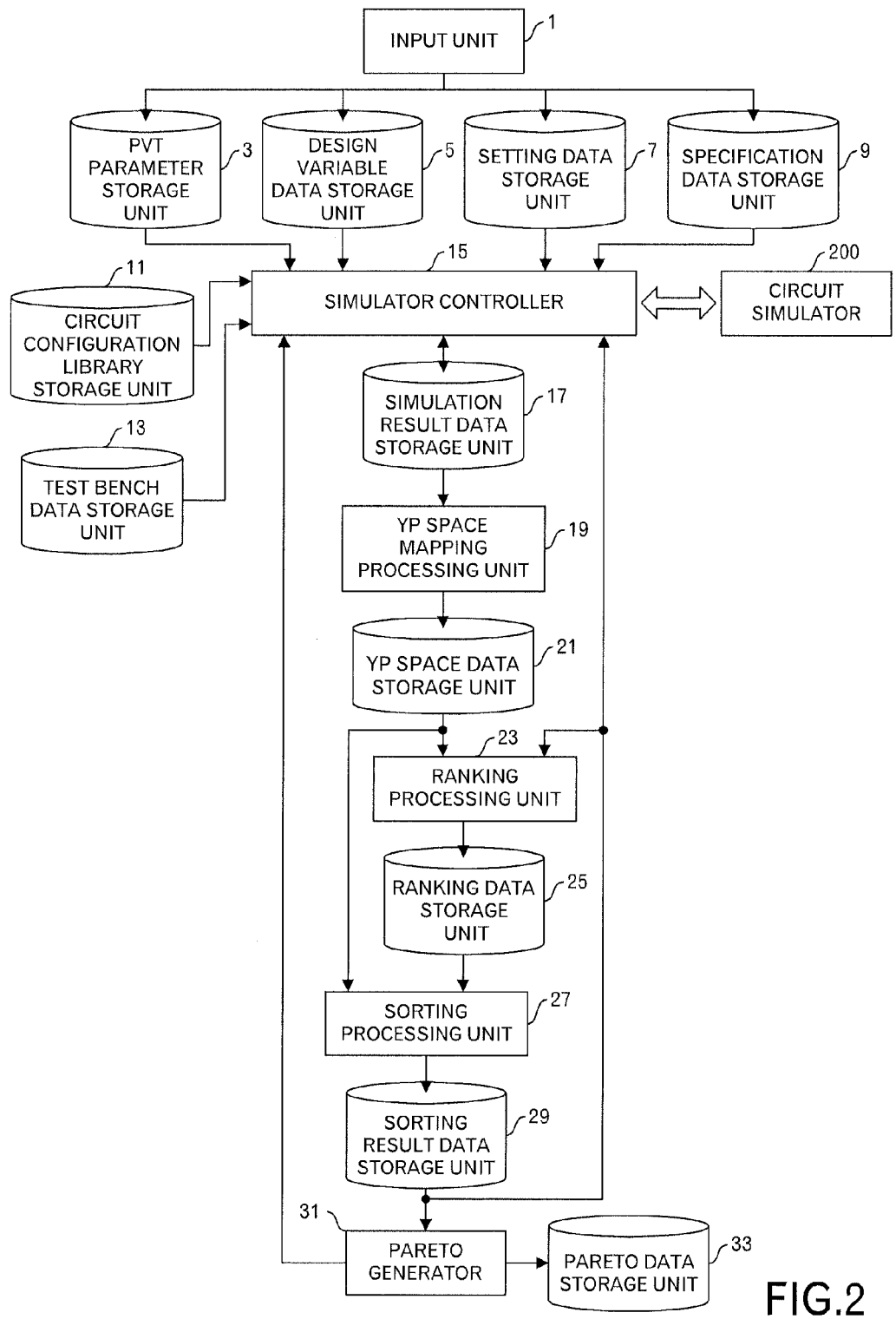
FIG. 2 is a functional block diagram of a pareto data generation apparatus relating to an embodiment of this technique.

FIG. 2 depicts a functional block diagram of a pareto data generation apparatus in an automatic circuit design support apparatus relating to an embodiment of this technique. Incidentally, in this embodiment, the automatic circuit design support apparatus includes the pareto data generation apparatus to generate pareto data described below and an automatic optimum circuit design apparatus to carry out a processing for calculating optimum values of design variables for requirement specification by using the generated pareto data. Incidentally, these apparatuses may be integrated.

The pareto data generation apparatus has an input unit 1; a PVT parameter storage unit 3; a design variable data storage unit 5; a setting data storage unit 7; a specification data storage unit 9; a circuit configuration library storage unit 11; a test bench data storage unit 13; a simulator controller 15; a simulation result data storage unit 17; Yield-embedded Performance (YP) space mapping processing unit 19; a YP space data storage unit 21; a ranking processing unit 23; a ranking data storage unit 25; a sorting processing unit 27; a sorting result data storage unit 29; a pareto generator 31; and a pareto data storage unit 33. Incidentally, the pareto data generation apparatus may include a circuit simulator 200 or may be separated from an apparatus having the circuit simulator 200.

The input unit 1 stores data accepted from, for example, a user, into the PVT parameter storage unit 3, design variable data storage unit 5, setting data storage unit 7 and specification data storage unit 9. The simulator controller 15 uses data stored in the PVT parameter storage unit 3, design variable data storage unit 5, setting data storage unit 7, specification data storage unit 9, circuit configuration library storage unit 11, test bench data storage unit 13 and sorting result data storage unit 29, and cooperates with the pareto generator 31 and circuit simulator 200 to carry out a processing. The simulator controller 15 stores intermediate processing results and simulation result data as final processing results into the simulation result data storage unit 17. The YP space mapping processing unit 19 carries out a processing using data stored in the simulation result data storage unit 17, and stores the processing results into the YP space data storage unit 21. The ranking processing unit 23 carries out a processing using data stored in the YP space data storage unit 21 and sorting result data storage unit 29, and stores the processing results into the ranking data storage unit 25. The sorting processing unit 27 carries out a processing using data stored in the ranking data storage unit 25 and YP space data storage unit 21, and stores the processing results into the sorting result data storage unit 29. The pareto generator 31 carries out a processing using data stored in the sorting result data storage unit 29, and stores the processing results into the pareto data storage unit 33.

Incidentally, although it is not depicted in the figure due to the complexity, the data stored in the setting data storage unit 7 is used also by the ranking processing unit 23 and sorting processing unit 27 in addition to the simulator controller 15.

Figure 3:
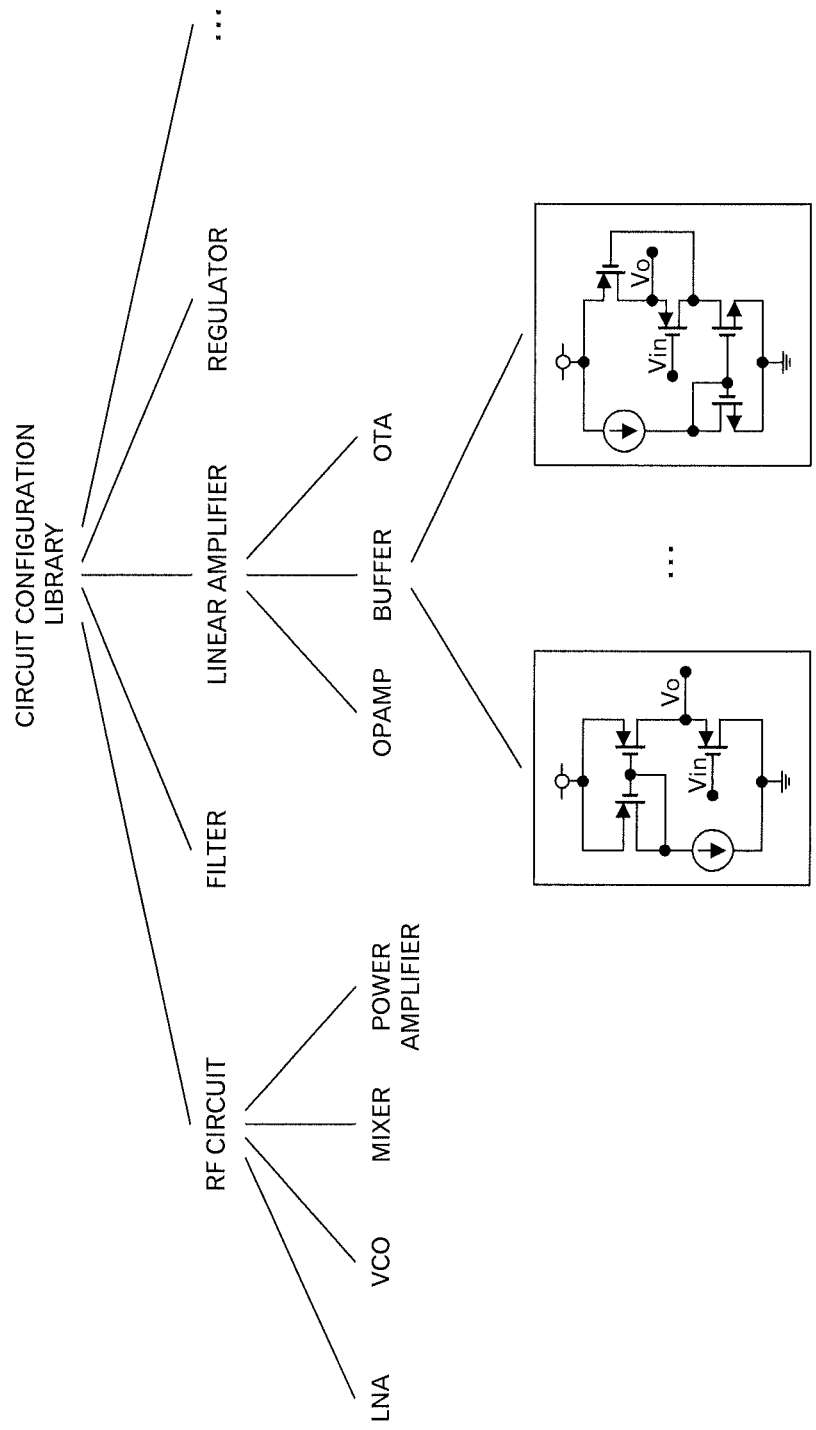
FIG. 3 is a diagram depicting an example of data stored in a circuit configuration library storage unit.

The circuit configuration library storage unit 11 stores circuit configurations in data structure as depicted in FIG. 3, for example. Namely, a tag representing characteristics and function of the circuit configuration is attached to each of the circuit configurations to construct a layer type of data structure depicted in FIG. 3. Therefore, a search for the circuit configurations having specific characteristics and function can be conducted. In an example of FIG. 3, functions are categorized, in the first layer, into, for example, an RF circuit, a filter, a linear amplifier, a regulator and the like. The second layer of the RF circuit includes a Low Noise Amplifier (LNA), a Voltage Controlled Oscillator (VCO), a mixer, a power amplifier and the like, and the second layer of the linear amplifier includes an operational amplifier (OPAMP), a buffer, an Operational Transconductance Amplifier (OTA) and the like. FIG. 3 schematically depicts that two different circuit configurations are registered for the buffer. For example, the circuit in the second layer is grasped as "a function" in the following.

Next, an operation of the pareto data generation apparatus will be explained using FIGS. 4 to 8. First, a user of the pareto data generation apparatus inputs, to the input unit 1, requirement specification data including performance items (e.g. consumed electric current, Total Harmonic Distortion (THD), DC gain, bandwidth and the like), data (e.g. identification information of the circuit configuration) designating a circuit configuration for which the pareto data is generated, design variables for which values can be designated by the designer for each circuit configuration and their fluctuation ranges, PVT parameters that vary according to the manufacturing and/or environment separately from an intention of the designer and their distributions, and other setting data (the number of designs (also called population size) in one iteration, the number of Monte Carlo Simulations for one design, the upper limit of the iterations (also called the number of generations), a threshold Yth of the yield rate, the number N of designs to be extracted and the like). The input unit 1 accepts input data from the user, and stores the input data for the requirement specification into the specification data storage unit 9, stores the input data for the PVT parameters into the PVT parameter storage unit 3, stores the input data for the design variables into the design variable data storage unit 5, and stores the input data for the setting data into the setting data storage unit 7 (step S1). Incidentally, at this stage, data of the circuit configurations relating to the processing may be inputted into the circuit configuration library storage unit 11. In addition, the input unit 1 may obtain the input data prepared in other computers or the like, and may store the obtained input data into the PVT parameter storage unit 3 and the like.

For example, data as depicted in FIG. 5A is stored into the PVT parameter storage unit 3. In the example of FIG. 5A, distribution data is registered for each PVT parameter. The distribution data is used, for example, to generate the random number, and a type of distribution such as Gaussian distribution and data to define specific distribution (e.g. an average value $\mu$ and variance o) are designated. Incidentally, when the type of distribution is uniform, the upper limit U and lower limit L may be designated. In addition, as for the PVT parameter, intra-die variation and inter-die variation.

For example, the design variable data storage unit 5 stores data as depicted in FIG. 5B. In the example of FIG. 5B, the lower limit LLi and upper limit UUi are registered for each design variable. In addition, the median and fluctuation rate may be designated.

Next, the simulator controller 15 sets "1" to a counter n to count the number of iterations of the simulation (step S3). Then, the simulator controller 15 determines a designated number (i.e. equal to the population) of sets of values of the respective design variables within the designated ranges, according to data stored in the design variable data storage unit 5 and setting data storage unit 7, and stores the determined data into the simulation result data storage unit 17 (step S5). In the following, one set of the design variable values is called "design". Namely, at the step S5, a designated population number of designs are identified. Incidentally, at the step S5, respective values are determined by generating the random numbers.

For example, data as depicted in FIG. 6 is stored in the simulation result data storage unit 17. In the example of FIG. 6, a design identifier (ID) assigned to each design, a design instance ID assigned to each combination of the circuit configuration, design variable value set and PVT parameter value set, an ID of the circuit configuration to be used, values of the respective design variables and values of the respective parameters are stored. At the step S5, the values of the respective design variables are generated and data structure as depicted in FIG. 6 is stored.

Next, the simulator controller 15 generates, for each design variable value set generated at the step S5, a predetermined number of sets of values of the respective PVT parameters stored in the PVT parameter storage unit 3, according to the designated distribution stored in the PVT parameter storage unit 3, and stores the generated data into the simulation result data storage unit 17 (step S7). As depicted in FIG. 6, plural PVT parameter value sets are registered for one design ID (i.e. a combination of one design variable value set and one circuit configuration).

After that, the simulator controller 15 outputs, for each combination (i.e. for each design instance) of the design variable value set, PVT parameter value set and circuit configuration, which are stored in the simulation result data storage unit 17, data of the design instance to the circuit simulator 200, and causes the circuit simulator 200 to execute a circuit simulation (step S9). At this time, the simulator controller 15 reads out data for the applicable circuit configuration from the circuit configuration library storage unit 11, and outputs the read data to the circuit simulator 200. In addition, the simulator controller 15 reads out the test bench data that is data of the peripheral circuit required for the applicable circuit configuration from the test bench data storage unit 13, and output the read data to the circuit simulator 200. Furthermore, the simulator controller 15 instructs the circuit simulator 200 to calculate performance item values for the performance items stored in the specification data storage unit 9.

Figure 7:
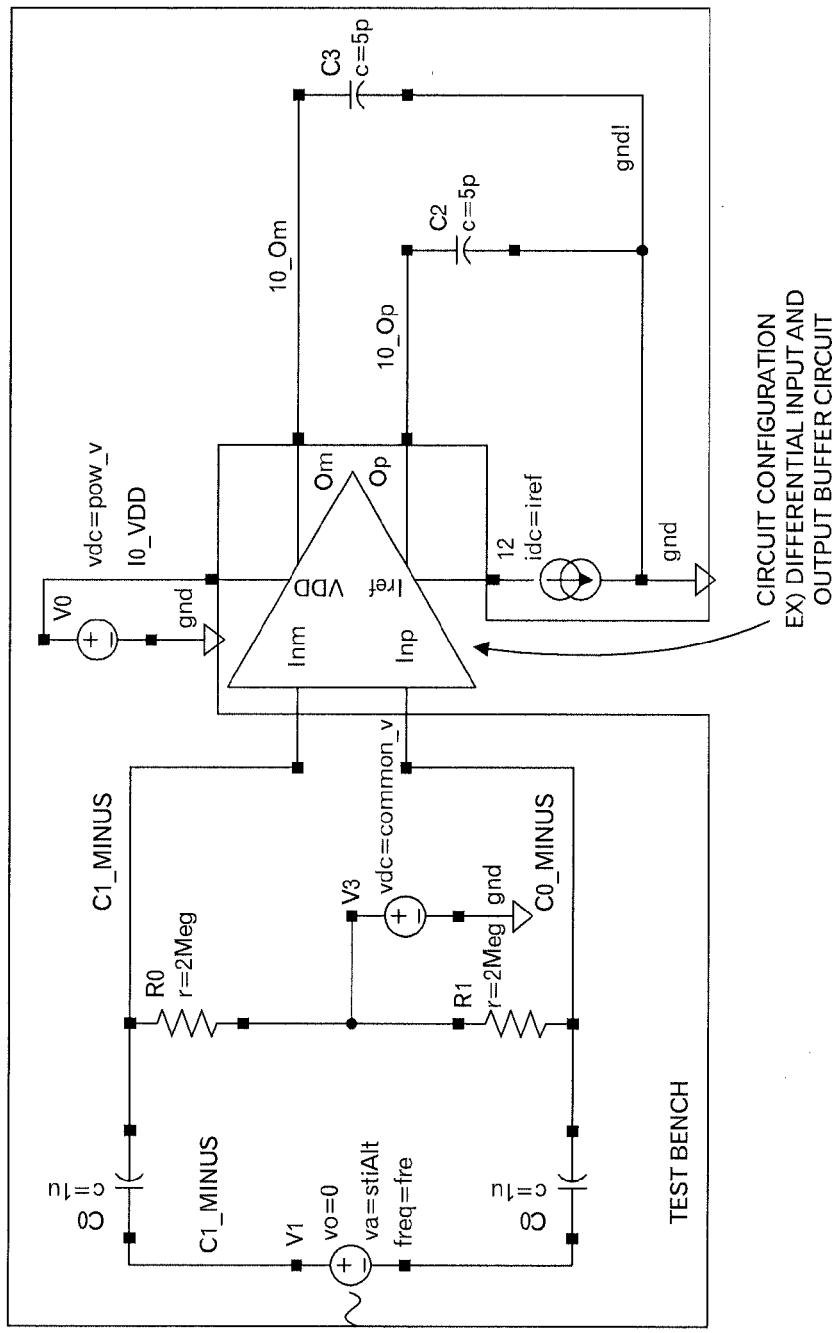
FIG. 7 is a diagram depicting an example of a peripheral circuit data.
Figure 9:
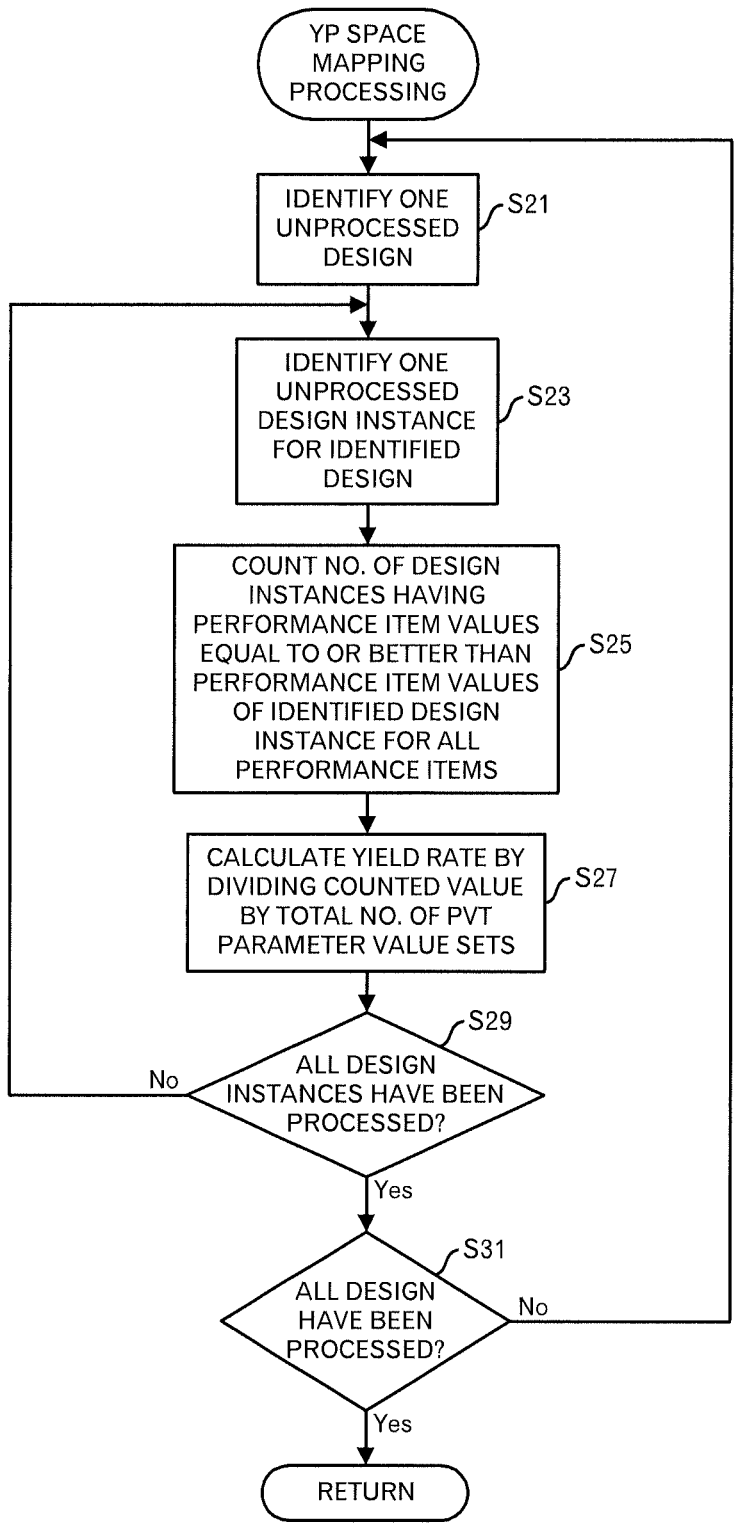
FIG. 9 is a diagram depicting a processing flow of a YP space mapping processing.

FIG. 7 depicts an example of data of the peripheral circuit, which is read out from the text bench data storage unit 13. In the example of FIG. 7, a differential input and output buffer circuit, which is a circuit configuration relating to this processing, is depicted in the center, and power supply circuit, circuits required for the measurement of the performance items and like are connected to power supply terminal and input and output terminals of the differential input and output buffer circuit. Such a peripheral circuit is already known, hence further explanation is omitted.

Furthermore, the simulator controller 15 obtains, for each design instance, values of the respective performance items as the simulation result, from the circuit simulator 200, and stores the simulation result into the simulation result data storage unit 17. For example, data as depicted in FIG. 8 is stored in the simulation result data storage unit 17. In the example of FIG. 8, in addition to the data structure as depicted in FIG. 6, the values of the respective performance items is registered for each design instance.

After that, the YP space mapping processing unit 19 carries out a YP space mapping processing for data stored in the simulation result data storage unit 17 (step S11). This YP space mapping processing will be explained by using FIGS. 9 to 13.

The YP space mapping processing unit 19 identifies one unprocessed design registered in the simulation result data storage unit 17 (step S21). In addition, the YP space mapping processing unit 19 identifies one unprocessed design instance for the identified design (step S23). After that, the YP space mapping processing unit 19 counts the number of design instances having the performance values equal to or better than the corresponding performance values of the identified design instance for all performance items, and stores the counted value into a storage device such as a main memory (step S25).

Figure 1:
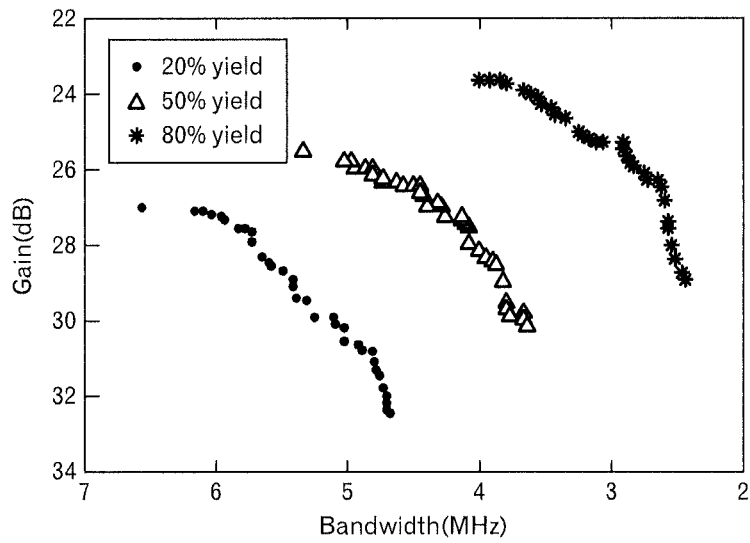
FIG. 1 is a diagram to explain a processing result of a conventional art.
Figure 10:
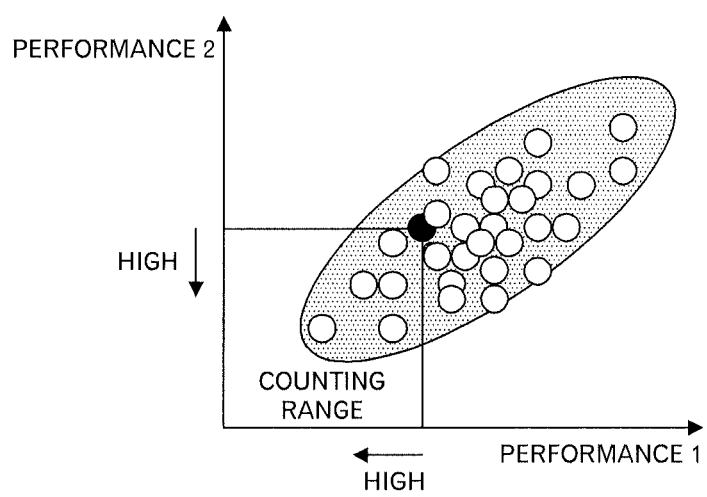
FIG. 10 is a diagram to explain calculation of a yield rate.

The step S25 is explained by using FIG. 10. FIG. 10 depicts an example when considering two performance items, and it is assumed that the nearer to the origin the value is, the higher the performance is (or the better the performance is). At this time, the design instance is plotted at the position of a circle mark based on its performance item values, and the design instance identified at the step S23 is shown by a black circle. Incidentally, a hatched ellipse virtually shows distribution region of the design instances. In such a case, the design instances having the performance item values equal to or better than those of the identified design instance for all performance items are design instances included in a rectangular range whose upper right vertex is a point of the black circle. Incidentally, even if the number of performance items is three or more, the condition to count the number of design instances is similar. Namely, the number of design instances having the performance item values equal to or better than the corresponding performance item values of the identified design instance for all performance items. Incidentally, the identified design instance is included in the counted design instances.

Such counting is carried out because, in this embodiment, an appearance probability of the design instances having the performance equal to or better than the performance of the identified design instance is defined as the yield rate. The condition that the design instance has the performance equal to or better than the performance of the identified design instance is a condition that the design instance has all of the performance item values equal to or better than the corresponding performance item values of the identified design instance.

Then, the YP space mapping processing unit 19 calculates the yield rate by dividing the counted value by the total number of design instances (i.e. the total number of PVT parameter values. In other words, the number of simulations per one design.), and stores the yield rate into the YP space data storage unit 21 in association with data of the design instance (step S27).

For example, data as depicted in FIG. 11 is stored in the YP space data storage unit 21. In the example of FIG. 11, the yield rate calculated at the step S27 is registered in association with data of the design instance depicted in FIG. 8.

After that, the YP space mapping processing unit 19 judges whether or not all design instances have been processed (step S29). When there is an unprocessed instance, the processing returns to the step S23. On the other hand, when all of the design instances have been processed, the YP space mapping processing unit 19 judges whether or not all designs have been processed (step S31). When there is an unprocessed design, the processing returns to the step S21. When all designs have been processed, the processing returns to the calling source processing.

Figure 12:
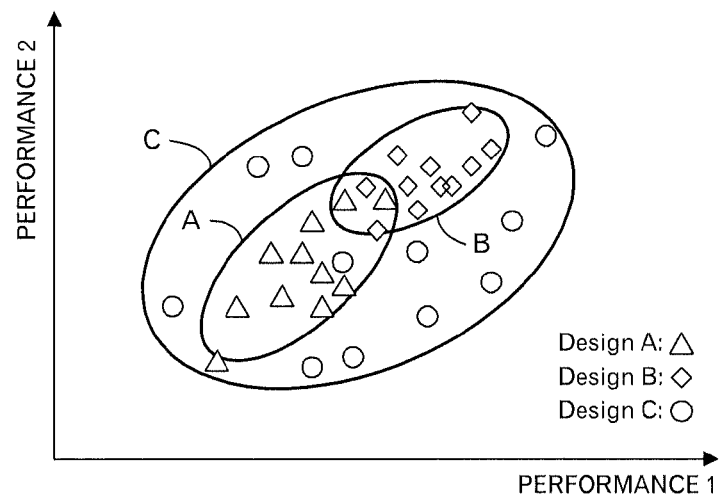
FIG. 12 is a diagram depicting a state in which the simulation results are plotted in a performance space.
Figure 13:
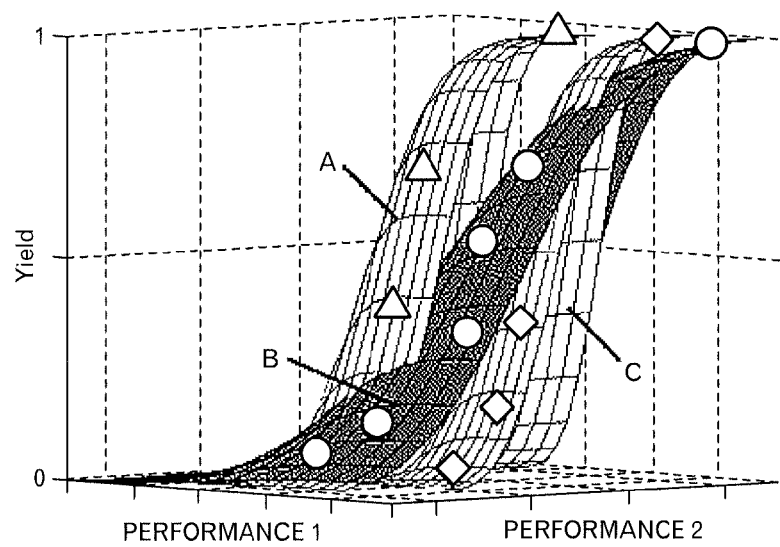
FIG. 13 is a diagram depicting an example of a YP space.

In this embodiment, (N+1)-dimensional YP space is introduced by adding one dimension of the yield rate to N-dimensional performance space (e.g. N is the number of performance items) as depicted in FIG. 10. Specifically, for example, as depicted in FIG. 12, when there are design A including design instances shown by triangular marks, design B including design instances shown by diamond marks and design C including design instances shown by circular marks, the designs A to C are represented by curved surfaces as depicted in FIG. 13 in three dimensional YP space. Such curved surfaces are also called design surfaces. However, each surface represents a set of points respectively corresponding to the design instances included in the design. The coordinate values of each point are identified by the respective performance item values $p_i$ ($1 \leq i \leq N$. N is the number of performance items to be evaluated.) and the yield rate Y.

Namely, the coordinate values are represented by (p1, p2, p3, ... pN, Y). In addition, the point in the YP space is called YP point.

Figure 4:
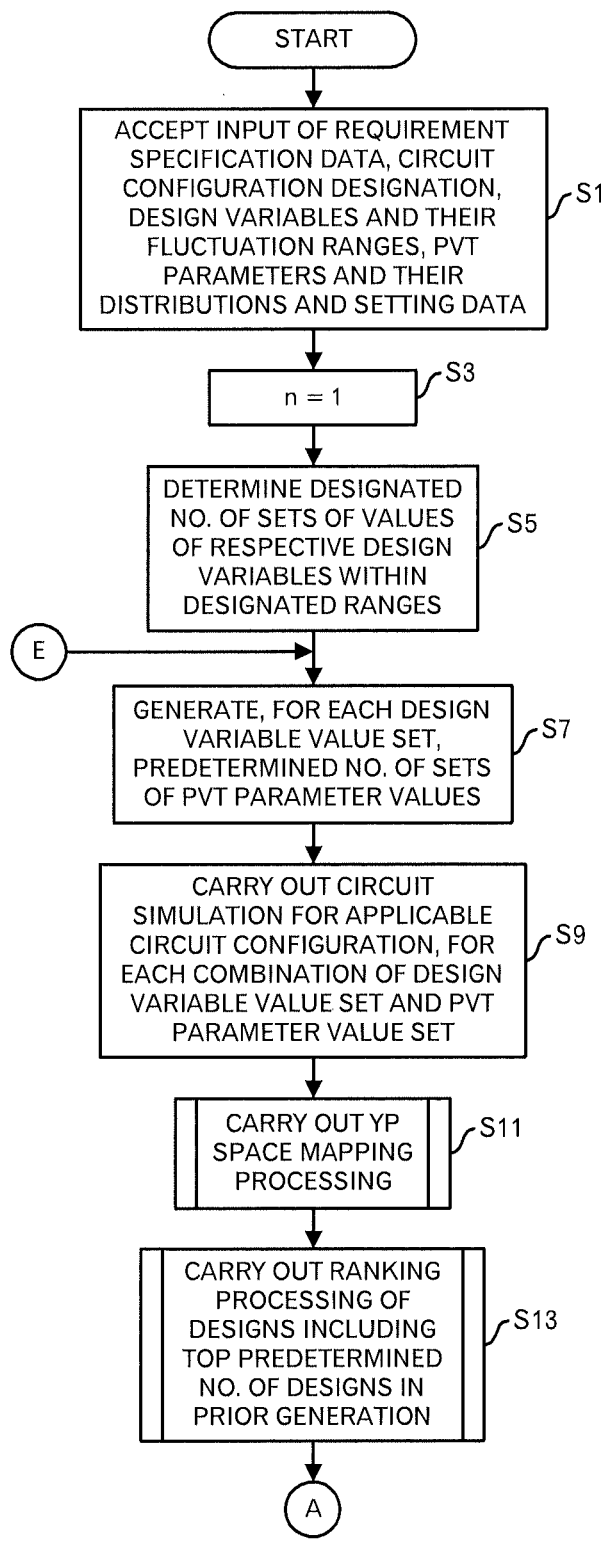
FIG. 4 is a diagram depicting a main processing flow of the pareto data generation apparatus.

Returning to the explanation of FIG. 4, next, the ranking processing unit 23 carries out a ranking processing of the designs, including a top predetermined number of designs (also called elite designs) in the previous generation, which are stored in the sorting result data storage unit 29, and designs, which are registered in the YP space data storage unit 21 and are generated this time, and stores the processing result into the ranking data storage unit 25 (step S13). This ranking processing will be explained by using FIG. 14A to 16. Incidentally, after this ranking processing, the processing moves to a processing of FIG. 17 through a terminal A.

Figure 14A:
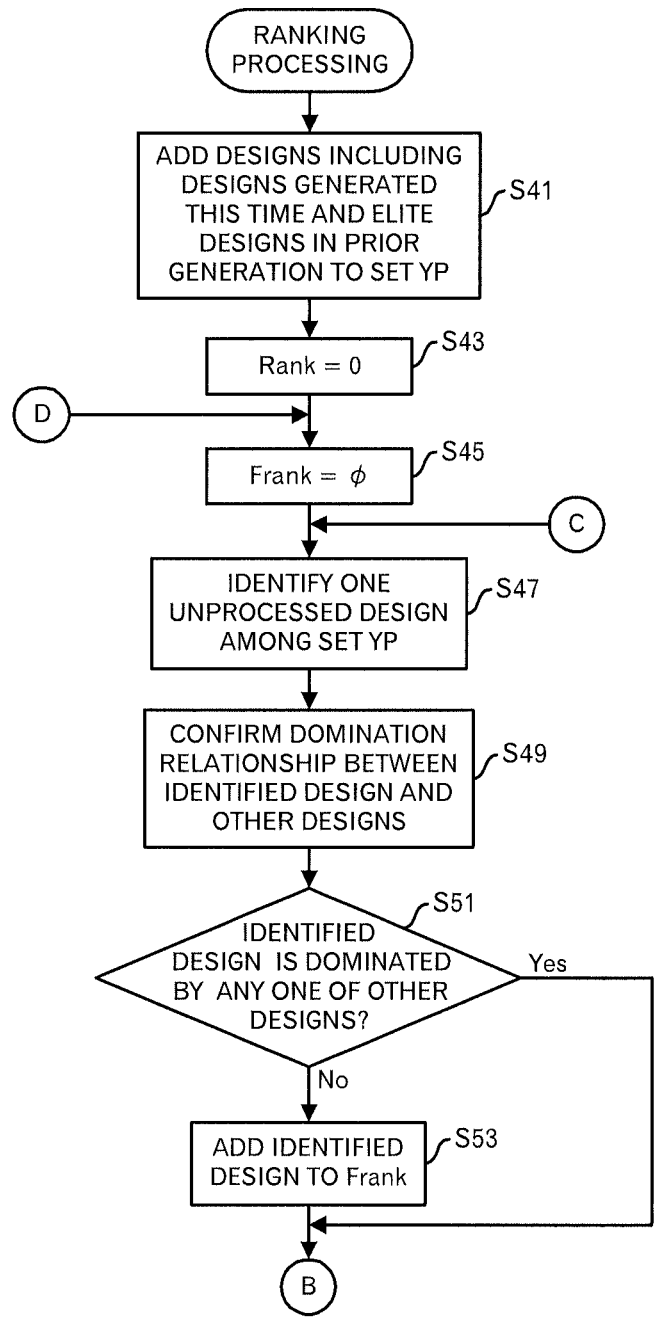
FIG. 14A is a diagram depicting a processing of a ranking processing.

In the ranking processing, the ranking processing unit 23 adds the designs including the elite designs in the previous generation, which are stored in the sorting result data storage unit 29, and designs generated this time to a set YP (FIG. 14A: step S41). Initially, the empty φ is set to the set YP, before the step S41. In addition, in case of the first processing, there is no elite design in the previous generation. Therefore, only the designs generated this time are added to the set YP.

In addition, the ranking processing unit 23 initializes the counter Rank of the rank to "0" (step S43). In addition, ranking processing unit 23 sets the empty φ to a set Frank to temporarily hold the applicable designs (step S45).

Then, the ranking processing unit 23 identifies one unprocessed design among the set YP (step S47). After that, the ranking processing unit 23 confirms the domination relationship between the identified design and other designs (step S49).

In this embodiment, the domination relationship between YP points (corresponding to the design instances) in the YP space is defined as follows:

As a premise, it is defined that the performance $P_1$ of the design 1 dominates the performance $P_2$ of the design 2 as follows:

$$P1 \prec P2 \Leftrightarrow \cdot i(p_{1i} \leq p_{2i}) \wedge \exists i(p_{1i} < p_{2i}), i=1 \ldots N \qquad (1)$$

Incidentally, $p_{1i}$ represents a value of the i-th performance item, which is included in the performance $P_1$, and $p_{2i}$ represents a value of the i-th performance item, which is included in the performance $P_2$. The expression (1) represents the performance $P_1$ dominates the performance $P_2$, when the values of all performance items of the design 1 are equal to or better than the corresponding values of the performance items of the design 2 and a value of any one of the performance items of the design 1 is better than a value of the corresponding performance item of the design 2.

Figure 14B:
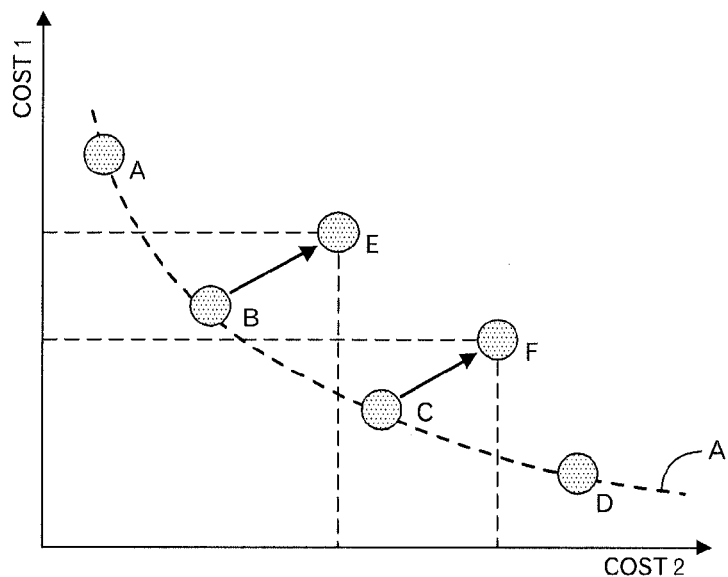
FIG. 14B is a schematic diagram to explain domination relationship.

First, the domination relationship for the performance is explained by using FIG. 14B. Here, it is assumed that there are only two performance items, and a first performance item is represented as cost 1 by a vertical axis, and the lesser the value is, the lower the cost is. In addition, a second performance item is represented as cost 2 by a horizontal axis, and the lesser the value is, the lower the cost is. Here, when the values of the costs 1 and 2 are identified by carrying out the circuit simulation, the results can be plotted on the two-dimensional space (also called solution space or solution specification space) as depicted in FIG. 14B. In the example of FIG. 14B, 6 points A to F (called solutions) are obtained. In such a situation, of course, because it is preferable that the costs 1 and 2 are lower values, the nearer to the origin the point is, the better the solution is. Then, "X dominates Y" in this embodiment means all components of Y are equal to or worse than corresponding components of X, and at least one component of Y is worse than the corresponding component X. On the two-dimensional space as depicted in FIG. 14B, because the costs 1 and 2 of B are better than those of E, "B dominates E" is established. On the other hand, when A is compared with B, the cost 2 of A is lesser than that of B, however, the cost 1 of B is lesser than that of A. Therefore, "A dominates B" is not established. Such domination relationship is not established for A to D. The solution, which is not dominated by other solutions in the performance space in this way, namely, the non-dominated solution is called pareto. Moreover, the curve (surface in three-dimensional space or more) connecting the paretos is called a pareto curve (or surface).

Then, "point YPm dominates YPn" in the YP space is defined as follows:

$$YPm \prec YPn \Leftrightarrow \forall i(Pmi \leq Pni) \wedge (Ym \geq Yn) \wedge (\exists i (Pmi \neq Pni) \vee (Ym \neq Yn)) \text{ where } i=1 \ldots N, YPm, YPn \in YP \quad (2)$$

Here, $P_{mi}$ represents the i-th performance item value of the point YPm, and $P_{ni}$ represents the i-th performance item value of the point YPn. In addition, Ym represents the yield rate of the point YPm, and Yn represents the yield of the YPn. The expression (2) represents that the point YPm dominates the point YPn, when all of the performance item values of the point YPm are equal to or better than the corresponding performance item values of the point YPn, and the yield rate of the point YPm is equal to or better than the yield rate of the point YPn, and further at least one of the performance item value of the point YPm is better than the corresponding performance item value of the point YPn or the yield rate of the point YPm is greater than the yield rate of the point YPn.

Furthermore, "the design A dominates the design B" is defined as follows:

$$D_A \prec D_B \Leftrightarrow \forall n YPn \in YP_{DesignB} \exists m YPm \in YP_{Designed} \text{ such that } YPm \prec YPn \quad (3)$$

Here, $YP_{DesignB}$ represents a surface (e.g. surface B in FIG. 13) generated by points corresponding to the design instances of the design B, and $YP_{DesignA}$ represents a surface (e.g. surface A in FIG. 13) generated by points corresponding to the design instances of the design A. Then, the expression (3) represents the design A dominates the design B, when a point YPm on the surface of the design A exists, which dominates all points YPn on the surface of the design B.

In the example of FIGS. 12 and 13, the design A dominates the design B, however, it cannot be said that the design A or B dominates the design C.

Incidentally, according to the characteristics of this YP space, it can be said that the design A dominates the design B, when the maximum yield rate of the design A is greater than the maximum yield rate of the design B, and the performance at the minimum yield rate of the design A dominates the performance at the minimum yield rate of the design B.

According to this definition, the domination relationships between the designs are confirmed at the step S49.

When it is judged that the design identified at the step S47 is dominated by any one of the other designs (step S51: Yes route), the processing moves to a processing of FIG. 15 through a terminal B. On the other hand, when the design identified at the step S47 is not dominated by any one of the other designs (step S51: No route), the ranking processing unit 23 adds the design identified at the step S47 to the set Frank (step S53). Then, the processing moves to the processing of FIG. 15 through the terminal B.

Figure 15:
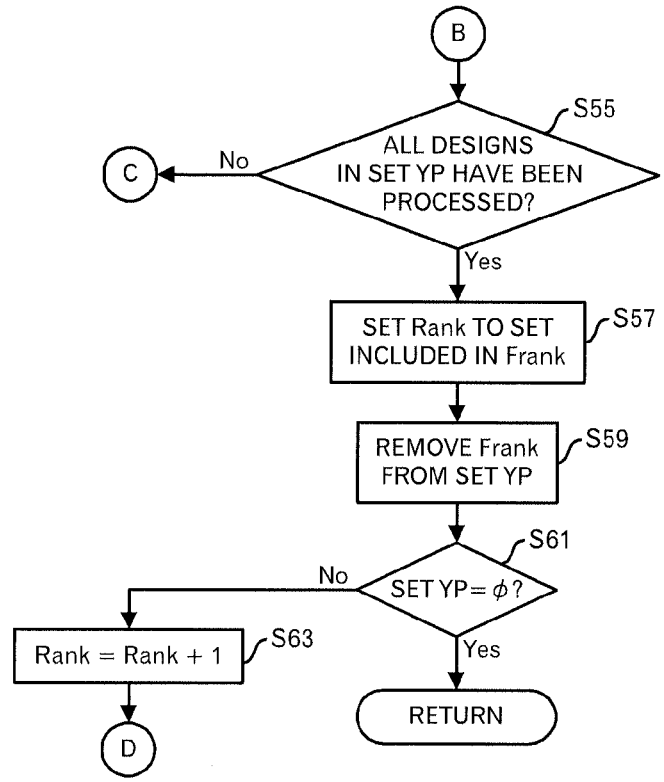
FIG. 15 is a diagram depicting a processing flow of the ranking processing.

Shifting to the explanation of the processing in FIG. 15, the ranking processing unit 23 judges whether or not all designs of the set YP have been processed (step S55). When there is an unprocessed design, the processing returns to the step S47 through a terminal C. On the other hand, when all of the designs have been processed, the ranking processing unit 23 sets the value of Rank to the designs included in the set Frank, and stores the processing result into the ranking data storage unit 25 (step S57).

Figures 16, 17:
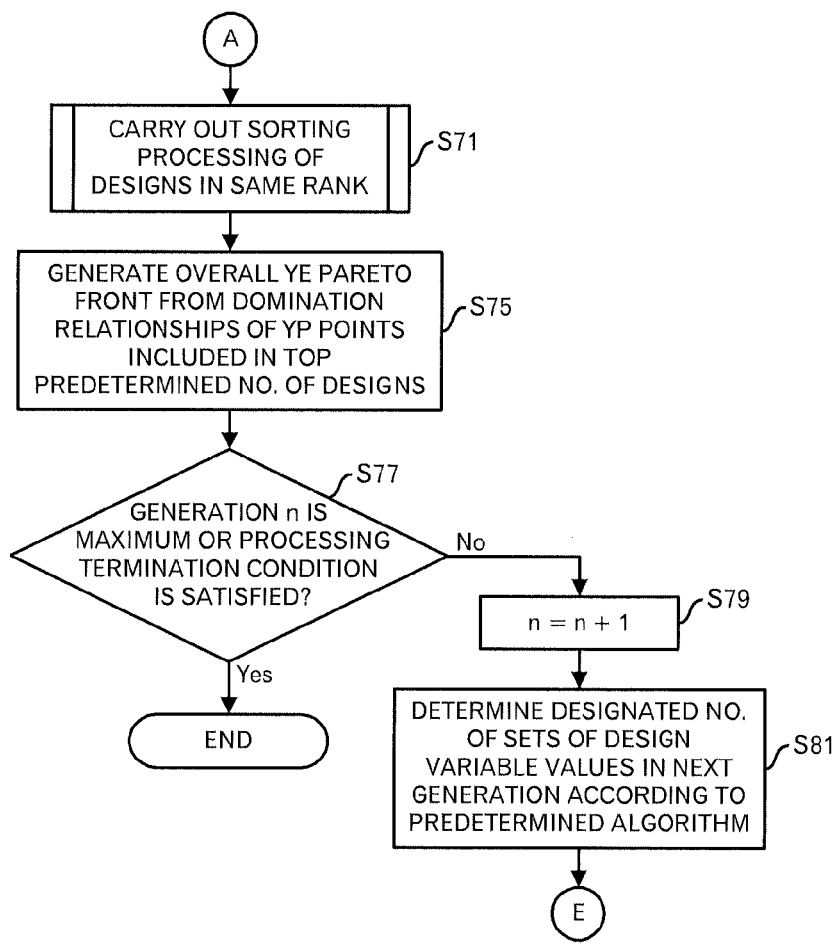
FIG. 16 is a diagram depicting an example of data stored in a ranking result storage unit.
FIG. 17 is a diagram depicting a main processing flow of the pareto data generation apparatus.

Data as depicted in FIG. 16 is stored in the ranking data storage unit 25, for example. In the example of FIG. 16, IDs of the designs belonging to this rank are registered for each rank. Incidentally, the value of the identified Rank may be additionally registered to data as depicted in FIG. 11.

Then, the ranking processing unit 23 removes the designs included in the set Frank from the set YP (step S59). After that, the ranking processing unit 23 judges whether or not the set YP becomes empty $\phi$ (step S61). When the set YP is not empty, the ranking processing unit 23 increments the value of Rank by "1", and the processing returns to the step S45 through a terminal D. Incidentally, at the next S47, all of the designs belonging to the set YP are handled as "unprocessed designs". On the other hand, when the set YP becomes empty, the processing returns to the calling source processing.

Incidentally, because the processing of the step S13 is a processing to extract a top predetermined number of elite designs, when the number of designs to which the value of Rank is assigned exceeds the predetermined number, the processing may be terminated even when the set YP is not empty.

The processing of FIG. 4 moves to a processing of FIG. 17. Next, the sorting processing unit 27 carries out a sorting processing of the designs in the same rank (step S71). This sorting processing will be explained by using FIGS. 18 to 25.

First, the sorting processing unit 27 initialized a counter "i" to "0" (step S91). Then, the sorting processing unit 27 identifies the designs belonging to the i-th rank from data stored in the ranking data storage unit 25, and judges whether or not plural designs belong to the i-th rank (step S93). When only one design belongs to the i-th rank, no sorting for the design belonging to the i-th rank is required. Therefore, the processing shifts to step S99.

On the other hand, when plural designs belong to the i-th rank, the sorting processing unit 27 counts the number of YP points that are on Yield-Embedded (YP) pareto front in the i-th rank for each design belonging to the i-th rank, and stores the counting result into a storage device such as a main memory (step S95).

Figure 19:
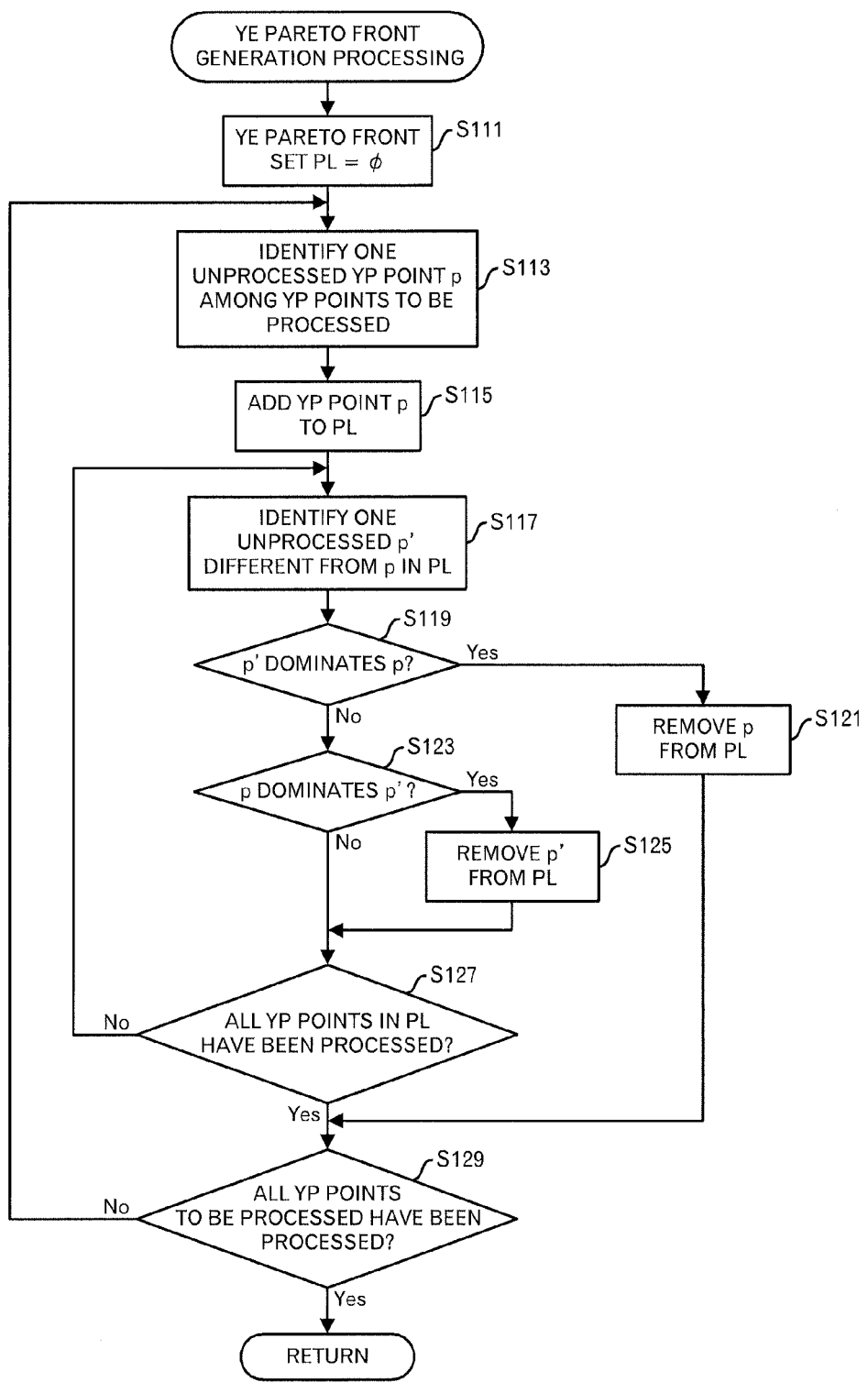
FIG. 19 is a diagram depicting a processing flow of a YE pareto front generation processing.

The YE pareto front is a pareto curve (or surface) in the YP space, and the processing as depicted in FIG. 19 is carried out at this step for the design instances of all designs in the same rank.

Incidentally, as for the YE pareto front generation, a method for discretely generating the overall YE pareto front by confirming the mutual domination relationships for all YP points of the respective designs or a method for identifying the YE pareto front for all designs by modeling the YP points of the respective designs by equations and mathematically analyzing the domination relationships among the equations may be employed.

Here, the former is explained. First, the sorting processing unit 27 set $\phi$ to the YE pareto front set PL (step S111). The YE pareto front set PL is stored in the sorting result data storage unit 29, for example. Then, the sorting processing unit 27 identifies an unprocessed YP point p among the YP points (at the step S95, all YP points of the designs belonging to the current rank) to be processed, which are registered in the YP space data storage unit 21 (step S113). Incidentally, in case of the step S95, only YP points whose yield rate is greater than a threshold Yth, which is stored in the setting data storage unit 7, are identified. When a typical YE pareto front is calculated, such a restriction is not used. However, because the probability that the YP point whose yield rate is extremely low is employed is low in this embodiment, the efficiency of the processing is improved by adopting such a restriction.

After that, the sorting processing unit 27 adds the YP point p to PL (step S115).

Furthermore, the sorting processing unit 27 identifies one unprocessed YP point p' different from p among the set PL (step S117). Then, the sorting processing unit 27 judges whether or not "p' dominates p" is satisfied (step 5119). When "p' dominates p" is satisfied, the sorting processing unit 27 removes p from the set PL, because p does not constitute the YE pareto front (step S121). Then, the processing shifts to step S129. On the other hand, "p' dominates p" is not satisfied, the sorting processing unit 27 judges whether or not "p dominates p'" is satisfied (step S123). When "p dominates p'" is satisfied, the sorting processing unit 27 removes p' from the set PL, because p' is unnecessary (step S125). Then, the processing shifts to step S127. Also in case where "p dominates p'" is not satisfied, the processing shifts to the step S127.

As depicted in FIG. 20, when p corresponds to "a" in FIG. 20 and p' corresponds to "b" in FIG. 20, "a dominates b" is satisfied. Therefore, "b" in FIG. 20 is removed from the set PL. On the other hand, when p' corresponds to "c", "a dominates c" is not satisfied. Therefore, "c" remains in the set PL. However, for example, when p corresponds to "d" in FIG. 20, "d dominates c" is satisfied. Therefore, "c" is removed from the set PL. Basically, even when p corresponds to "b" and p' corresponds to "a", the similar operation is carried out.

After that, the sorting processing unit 27 judges whether or not all of the YP points in the set PL have been processed (step S127). When all of the YP points in the set PL have not been processed, the processing returns to the step S117. On the other hand, when all of the YP points in the set PL have been processed, the sorting processing unit 27 judges whether or not all of the YP points to be processed have been processed (step S129). When at least one unprocessed YP point to be processed exists, the processing returns to the step S113. When all of the YP points to be processed have been processed, the processing returns to the calling-source processing.

By carrying out such a processing, the YP points included in the YE pareto front in the present rank can be obtained. At the step S95, it is identified to which design the YP points included in the YE pareto front belong, and the number of YP points is counted for each design.

Figure 18:
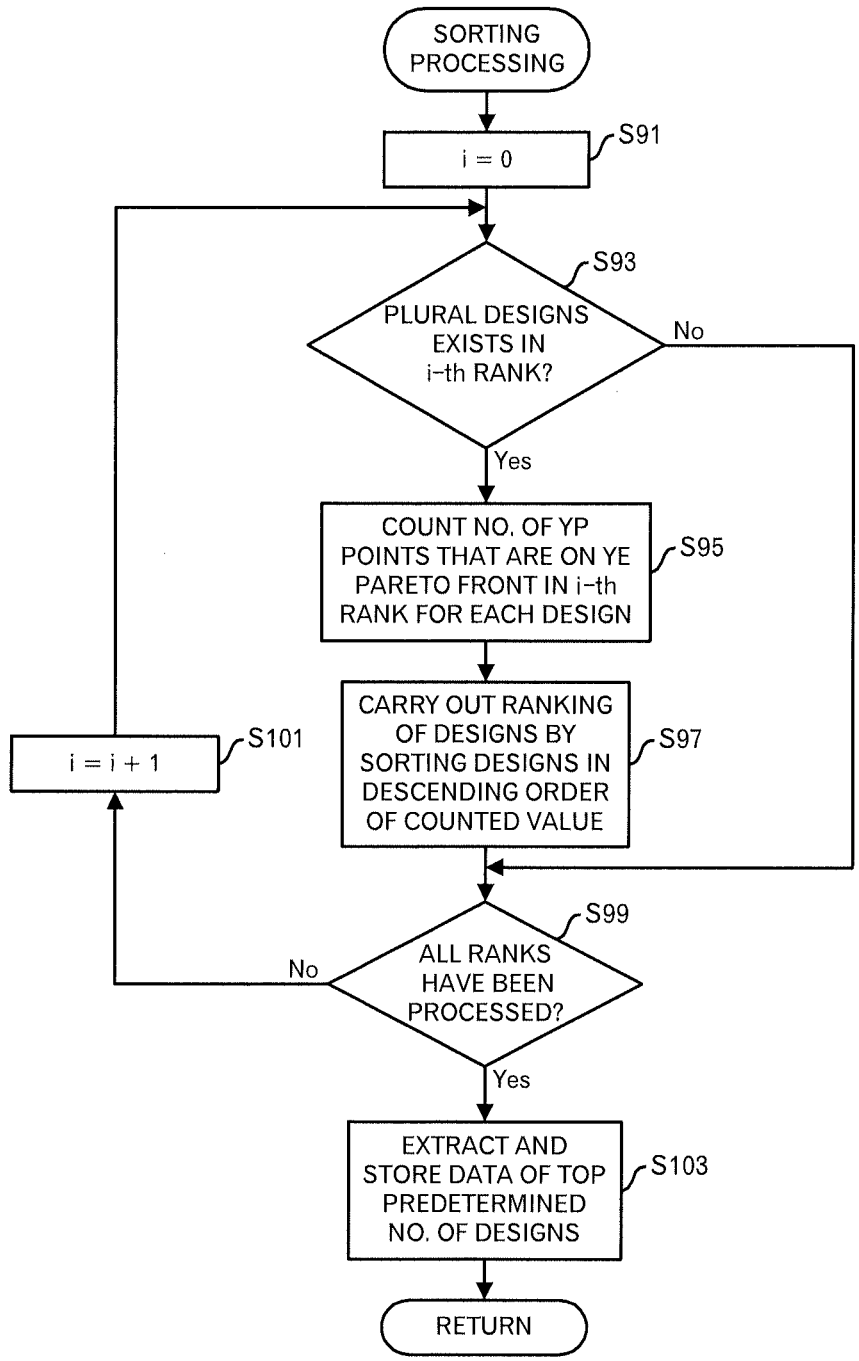
FIG. 18 is a diagram depicting a processing flow of a sorting processing.

Returning to the explanation of FIG. 18, the sorting processing unit 27 sorts the designs in descending order of the counted values at the step S95 to carry out ranking of the designs in the same rank, and stores the ranking result into the sorting result data storage unit 29 (step S97).

For example, data as depicted in FIG. 21 is stored in the sorting result data storage unit 29. The example of FIG. 21 depicts the result after reflecting the sorting result to the ranking result depicted in FIG. 16. In the example of FIG. 21, for each rank, the ranking of the design is made, and the first order in rank 0 is the design D1, and the second order in rank 0 is the design D2. In addition, the first order in rank 1 is the design D3, and the second order in rank 2 is the design D4. Because only design D5 is included in rank 2, the sorting is not carried out. However, the design D5 is registered as the first order in rank 2.

After that, the sorting processing unit 27 judges, based on whether or not the value of the counter i is equal to or greater than the maximum value of the rank, whether or not all ranks have been processed (step S99). When there is an unprocessed rank, the sorting processing unit 27 increments "i" by "1" (step S101), and the processing returns to the step S93.

On the other hand, when there is no unprocessed rank, the sorting processing unit 27 extracts data of a top predetermined number of designs from the YP space data storage unit 21, and stores the extracted data into the sorting result data storage unit 29 (step S103). Data in a similar data format to that depicted in FIG. 11 is stored in the sorting result data storage unit 29 as the data of a top predetermined number of designs. Then, the processing returns to the calling source processing.

Here, a processing of the step S13 and S71 will be schematically explained by using FIGS. 22 to 25.

First, FIG. 22 schematically depicts a case where the circuit simulation is carried out for the design D1 n times while changing the PVT parameter values, and the simulation results (i.e. samples) are arranged in ascending order of the values of one performance item (i.e. in descending order of the excellence). For example, in case of the m-th design instance, the performance is pm, and yield rate $Y_{D1}^{pm}$ is m/n.

Figure 23:
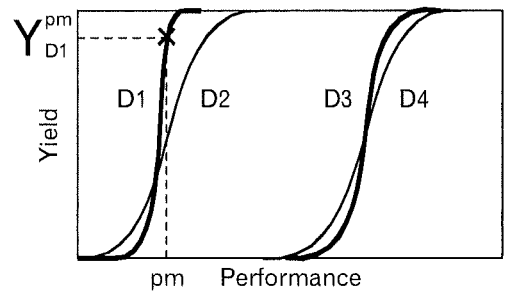
FIG. 23 is a diagram depicting an example of design curves in a YP space.

When calculating the yield rates for all of the design instances for each of the designs D1 to D4 and plotting calculated samples on the YP space mapped by the performance value and yield rate, a graph is obtained as depicted in FIG. 23. In the example of FIG. 23, the performance becomes high when going to left along the horizontal axis representing the performance. In addition, in the example of FIG. 23, a curve representing the design D1 and a curve representing the design D2 are crossing, and a curve representing the design D3 and a curve representing the design D4 are crossing.

Figure 24:
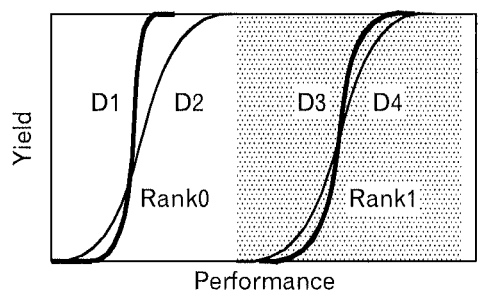
FIG. 24 is a diagram to explain the ranking processing.

Then, when the ranking processing of the step S13 is carried out, the design D1 dominates the designs D3 and D4, also apparently from FIG. 23. On the other hand, the design D2 also dominates the designs D3 and D4. However, it cannot be said that the design D1 dominates the design D2, and similarly it cannot be said that the design D2 dominates the design D1. Therefore, as depicted in FIG. 24, the designs D1 and D2 belong to Rank 0. Similarly, it cannot be said that the design D3 dominates the design D4, and it cannot be also said that design D4 dominates the design D3. Therefore, the designs D3 and D4 belong to Rank 1.

Figure 25:
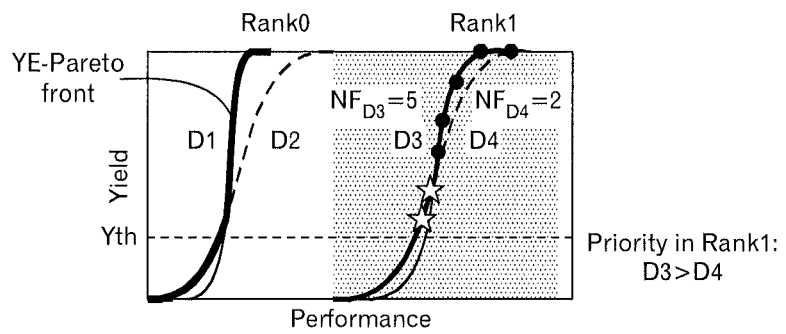
FIG. 25 is a diagram to explain the sorting processing.

Next, in the sorting processing of the step S71, the ranking of the designs within the same rank is carried out based on the number of YP points included in the YE pareto front. In FIG. 25, the YE pareto front is depicted by a thick line. In case of Rank 1, 5 YP points (=$NF_{D3}$ and, which are represented by black circles.) of the design D3 are adopted for the YE pareto front of the Rank 1, and two YP points (=$NF_{D4}$, and which are represented by star marks.) of the design D4 are adopted for the YE pareto front of the Rank 1. In this embodiment, only YP points whose yield rate is equal to or greater than the threshold Yth are compared, and in such a case, the design D3 is prioritized more than the design D4.

Incidentally, because the sorting processing is a processing to extract a top predetermined number of elite designs, when the accumulated number of designs up to a certain rank reached just the predetermined number, the step S71 may be skipped without carrying out the step S71. Furthermore, even if the accumulated number of designs up to a certain rank is not just the predetermined number, all of the designs may be extracted as the elite design up to such a rank when the accumulated number of designs exceeds the predetermined number. In such a case, the step S71 may be skipped.

Furthermore, also in case where it is necessary to extract only a top predetermined number of elite designs, the sorting processing may not be carried out for all ranks, and the sorting processing may be carried out only for the rank including the last design among a top predetermined number of elite designs to identify a top predetermined number of elite designs.

Returning to the explanation of the processing of FIG. 17, when the step S71 is carried out, the data of a top predetermined number of designs is stored in the sorting result data storage unit 29. Therefore, the pareto generator 31 confirms the domination relationships among the YP points included in a top predetermined number of designs to generate an overall YE pareto front, and stores data of the YP points included in the overall YE pareto front into the pareto data storage unit 33 (step S75). The specific processing is the same as the processing depicted in FIG. 19, basically. Then, data, for example, as depicted in FIG. 26 is stored in the pareto data storage unit 33. In the example of FIG. 26, each line represents data of the YP point included in the YE pareto front, and the data includes the design ID, design instance ID, ID of the circuit configuration, values of the respective design variables, values of the respective PVT parameters, values of the respective performance items and yield rate. FIG. 26 represents an example in case where one circuit configuration is designated and the aforementioned processing is carried out. Incidentally, after designating plural circuit configurations having the similar function, the aforementioned processing may be carried out. In such a case, as depicted in FIG. 27, plural kinds of IDs of the circuit configurations may be registered in the column of the ID of the circuit configuration.

Figure 28:
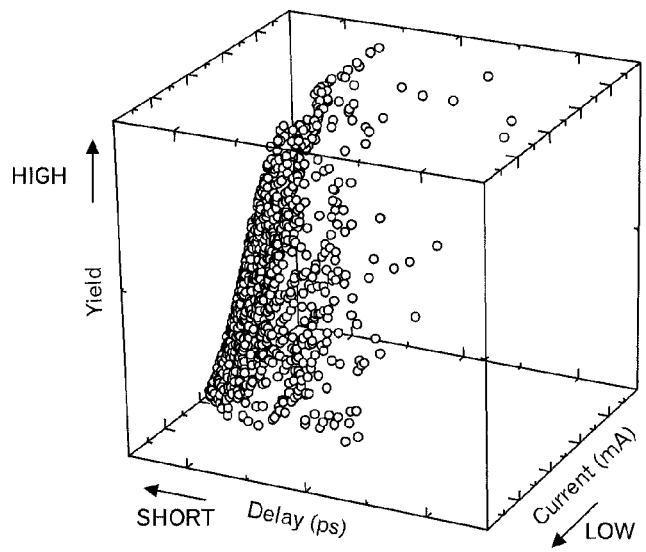
FIG. 28 is a diagram to explain an example of YE pareto fronts in the YP space.

FIG. 28 depicts an example of the overall YE pareto front that is generated at the step S75. In FIG. 28, in the YP space mapped by the delay, electric current value and yield rate, the YP points included in the YE pareto front are depicted by circles. Incidentally, in FIG. 28, the delay becomes lesser when going to the left, the electric current becomes lesser when going to the lower left and the yield rate becomes higher when going to the upper.

When the processing is completed, the pareto generator 31 notifies the simulator controller 15 of the processing completion. The simulator controller 15 judges whether or not the generation n reached the maximum value or other termination conditions are satisfied (step S77). For example, when referring to data in the pareto data storage unit 33 and it is confirmed that the sufficient performance can be ensured, it may be judged that the processing termination should be carried out. When the generation n reached the maximum value, or when other termination conditions are satisfied, the processing ends.

On the other hand, when the processing does not end, the simulator controller 15 increments n by 1 (step S79), and generates designated sets of design variable values in the next generation according to the predetermined algorithm, and stores the generated data into the simulation result data storage unit 17 (step S81). Then, the processing returns to the step S7 in FIG. 4 through a terminal E.

For example, as the multiobjective optimization processing method, Non-dominate Sorting Genetic Algorithm (NSGA-II) may be employed. Then, at the step S81, designated sets (i.e. designated populations) of design variable values in the next generation are generated by, for example, crossover processing or mutation processing. Incidentally, the genetic multiobjective optimization algorithm is well-known, and further explanation is omitted.

As described above, it is possible to generate the YE pareto front in the YP space mapped by the yield rate and the performance item values, and further to appropriately represent the relationship between the yield rate and the performance item values. Thus, it is possible for a user to appropriately grasp the trade-off between the yield rate and the performance items in restrictions including the function to be realized and other restrictions.

In addition, when the step S81 appropriately functions and the YE pareto fronts in more generations are generated, it becomes possible to obtain the design variable value sets by which the high performance and the high yield rate are obtained.

Incidentally, data in FIGS. 26 to 28 may be outputted to the user through an output device such as a display device, printer or the like.

Figure 29:
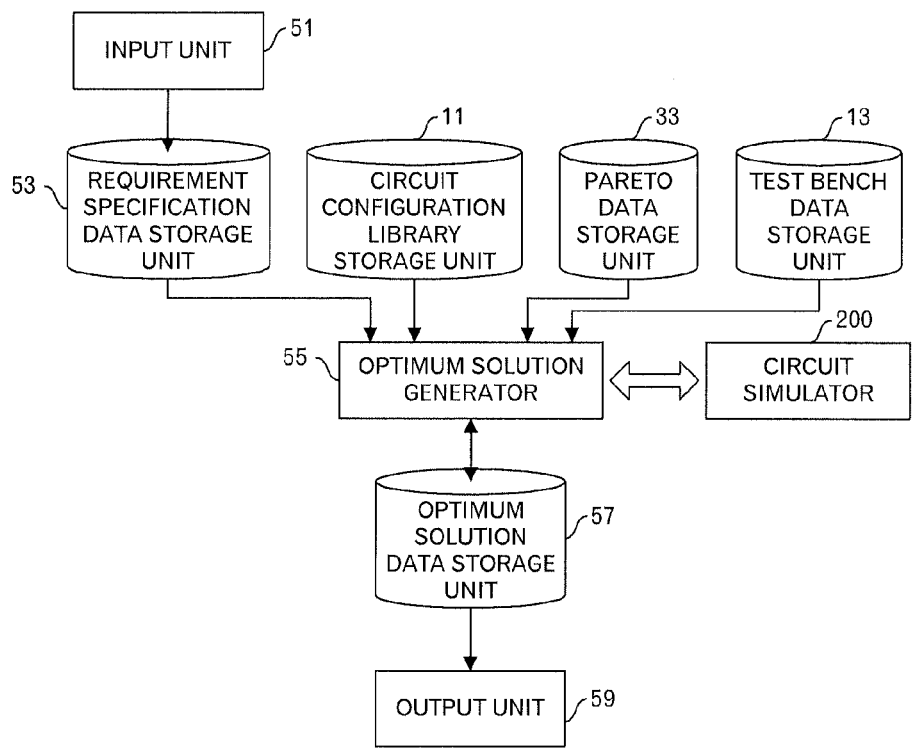
FIG. 29 is a functional block diagram depicting an automatic optimum circuit design apparatus.

Next, the automatic optimum circuit design apparatus in the automatic design support apparatus relating to this embodiment is explained by using FIG. 29. Incidentally, the same symbols are attached to the elements also depicted in the pareto data generation apparatus.

The automatic optimum circuit design apparatus includes an input unit 51; requirement specification data storage unit 53; circuit configuration library storage unit 11; pareto data storage unit 33; test bench data storage unit 13; optimum solution generator 55; optimum solution data storage unit 57; and output unit 59. The input unit 51 accepts the input from the designer, and stores the input data into the requirement specification data storage unit 53. The optimum solution generator 55 cooperates with the circuit simulator 200 and uses data stored in the requirement specification data storage unit 53, circuit configuration library storage unit 11, pareto data storage unit 33 and test bench data storage unit 13 to carry out a processing and stores the processing results including intermediate processing results into the optimum solution data storage unit 57.

Figures 30, 32:
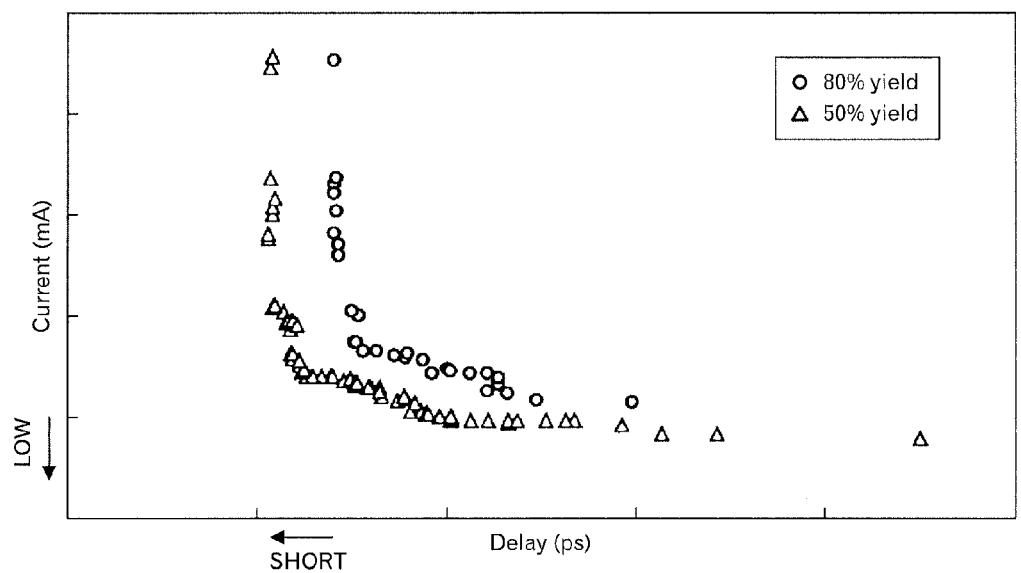
FIG. 30 is a diagram depicting an example of data stored in a specification data storage unit.
FIG. 32 is a diagram to explain an example of pareto curves obtained when designating the yield rate.

The designer designates a function of the circuit to be designed this time, and inputs the requirement specification data through the input unit 51. In response to this input, the input unit 51 accepts the input from the user, and stores the input data into the requirement specification data storage unit 53. For example, data as depicted in FIG. 30 is stored into the requirement specification data storage unit 53. The requirement specification defines characteristics to be satisfied by the entire circuit for each performance item, and in the example of FIG. 30, the respective items such as a consumed electric current value, THD, DC gain, bandwidth and the like are set. However, other performance items may be adopted. The value of the performance item is defined from the design target. Incidentally, in this embodiment, the requirement specification data storage unit 53 stores data representing which function or characteristic (e.g. buffer) is required for the circuit to be designed. In addition, the yield rate is also included in the requirement specification data in this embodiment. As depicted in FIG. 30, a specific value is designated for the yield rate, and stored into the requirement specification data storage unit 53.

Figure 31:
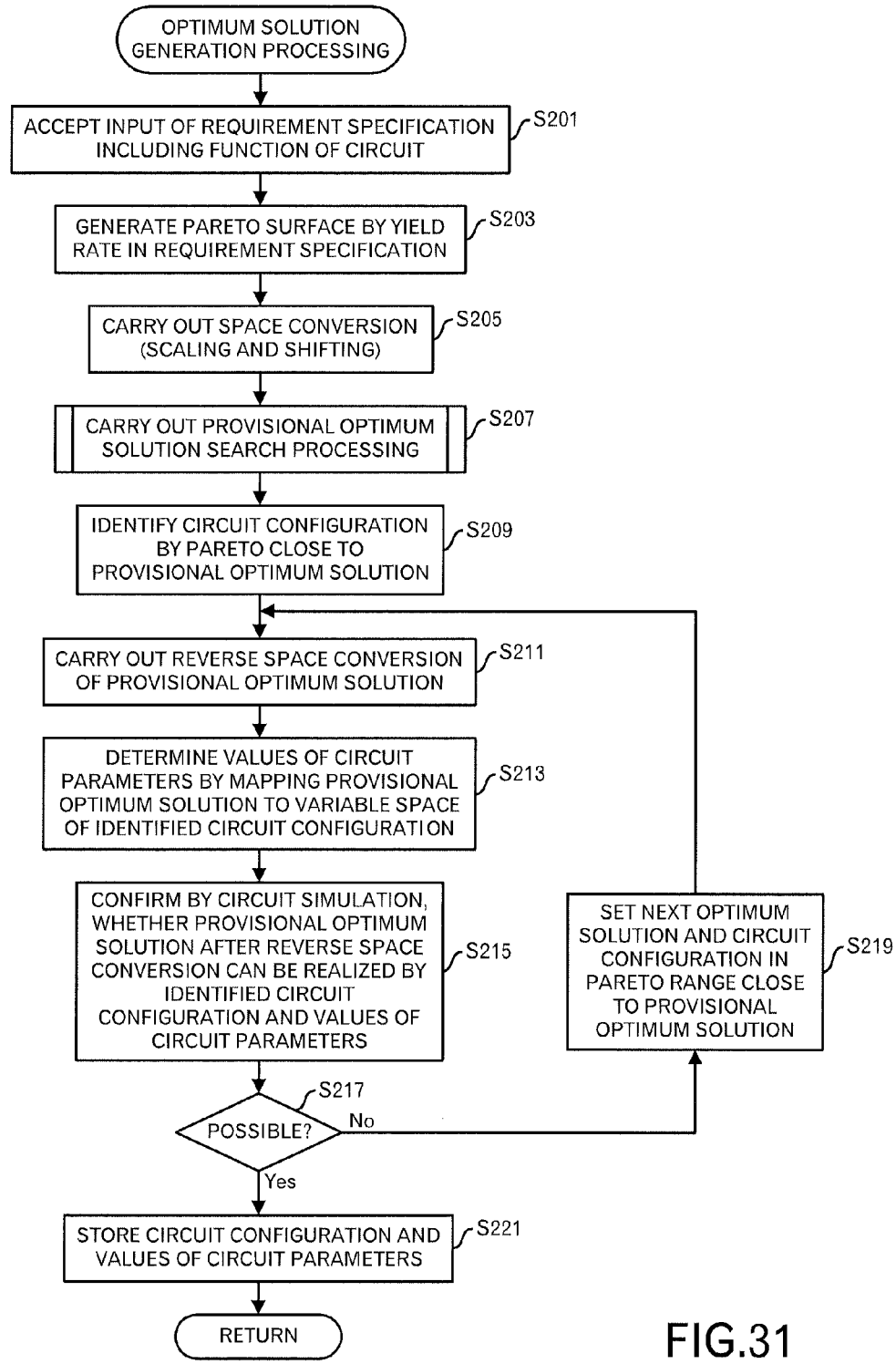
FIG. 31 is a diagram depicting a processing flow of an optimum solution generation processing.

Next, an operation of the automatic optimum circuit design apparatus will be explained by using FIGS. 31 to 35. First, the input unit 51 prompts the user to input requirement specification including a function of the circuit to be designed from now, accepts data of the requirement specification including the function of the circuit from the user and stores the input data into the requirement specification data storage unit 53 (FIG. 31: step S201). The requirement specification includes the requirement of the yield rate in addition to the requirement for the aforementioned performance items. Incidentally, the designation is carried out within a range of the requirement specification, which is a basis of the data stored in the pareto data storage unit 33.

Next, the optimum solution generator 55 generates a pareto surface from the YE pareto front stored in the pareto data storage unit 33 according to the yield rate included in the requirement specification stored in the requirement specification data storage unit 53, and stores data concerning the generated pareto surface into the optimum solution data storage unit 57 (step S203). For example, when the yield rate 50% is designated, data in lines in which 50% is registered in the column of the yield rate in the data structure as depicted in FIG. 26 is extracted. Incidentally, data in lines in which the yield rates within a range (e.g. a range from 46% to 54%) considered as being 50% are registered may be extracted.

Schematically, in the YP space depicted in FIG. 28, a cross section that is generated by cutting the YE pareto front by a plane, which is parallel to a plane mapped by the delay and electric current value and whose yield rate is the designated yield rate (e.g. 50%) becomes the pareto curve calculated at the step S203. This example is depicted in FIG. 32. As depicted in FIG. 32, the horizontal axis represents the delay, and the vertical axis represents the electric current value. Moreover, the value becomes better when going to the left along the horizontal axis, and when going to the bottom along the vertical axis. In the example of FIG. 32, the solutions belonging to the pareto curve in case of the yield rate 50% are represented by triangular marks, and the solutions belonging to the pareto curve in case of the yield rate 80% are represented by circular marks. Thus, the greater the delay is and the greater the electric current value is, the higher the yield rate is.

Incidentally, the format of the data stored at the step S203 in the optimum solution data storage unit 57 is similar to that of FIG. 26.

First, the optimum solution generator 55 carries out a space conversion (i.e. scaling and shifting) of the solution space so as to balance distribution of the values for each performance item in the requirement specification stored in the requirement specification data storage unit 53 (step S205). Because the processing is carried out for each of the performance items in the requirement specification designated by the user, the designated performance items are included in the performance items stored in the pareto data storage unit 33, and this step is carried out every execution of the step S205. At this step, a processing is carried out for data, which is extracted from the pareto data storage unit 33 and is stored in the optimum solution data storage unit 57, and the processing results are stored, for example, into the optimum solution data storage unit 57. The data format is the similar to that depicted in FIG. 26, for example.

For example, the distance between the requirement specification S and the pareto optimum solution P in the performance space (also called solution space) is defined as follows:

$$\|S-P\| = \sqrt{(S_1-P_1)^2 + (S_2-P_2)^2 + \ldots + (S_n-P_n)^2} \quad (4)$$

In such a case, for example, when the consumed electric current as one of the performance items is about several μA and the bandwidth as one of the performance items is about several GHz, the value of the consumed electric current is apparently less than the value of the bandwidth. Therefore, the consumed electric current is substantially ignored. In order to avoid such a situation and cause all of the performance items to be equivalently treated, the space conversion is carried out. Specifically, the Affine conversion as described below is carries out. Incidentally, $P_{Tran}$ represents a solution vector after the space conversion, $P_{samp}$ represents a solution vector (having n components. "n" is the number of performance items.) before the space conversion, $V_{Shift}$ represents a vector (having n components) for the parallel displacement, and $M_{scaling}$ represents a diagonal matrix (i.e. a matrix having n rows and n columns) to increase or decrease the values of the respective performance items in $P_{samp}$.

$$P_{Tran} = V_{shift} + M_{scaling} * P_{samp}$$

$$M_{scaling\_(i,j)} = \begin{cases} c_{i0}/(\max(obj_i) - \min(obj_i)) & (i = j) \\ 0 & (i \neq j) \end{cases}$$

$$V_{shift\_i} = -M_{scaling\_(i,i)} * \min(obj_i)$$

Incidentally, $M_{scaling\_(I,J)}$ represents a component at i-th row and j-th column of $M_{scaling}$. In addition, $\max(obj_i)$ means the maximum value of the i-th performance item among all of the pareto optimum solutions extracted at the step S203, and $\min(obj_i)$ means the minimum value of the i-th performance item among all of the pareto optimum solutions extracted at the step S203, similarly. Furthermore, $V_{shift\_i}$ represents the i-th component of $V_{shift}$. In addition, $c_{i0}$ is a constant designated for "i".

By carrying such a conversion, the space conversion so as to balance the respective performance items can be carried out. Namely, the respective performance items are almost equivalently treated.

Incidentally, when the distance is calculated, the same space conversion is required for the requirement specification S, naturally. By replacing $P_{samp}$ in the aforementioned expression with "S", the space conversion for the requirement specification S is conducted. The requirement specification after the space conversion is stored into the storage device such as the main memory.

Next, the optimum solution generator 55 carries out a provisional optimum solution search processing (step S207). This provisional optimum solution search processing will be explained by using FIG. 33.

Figure 33:
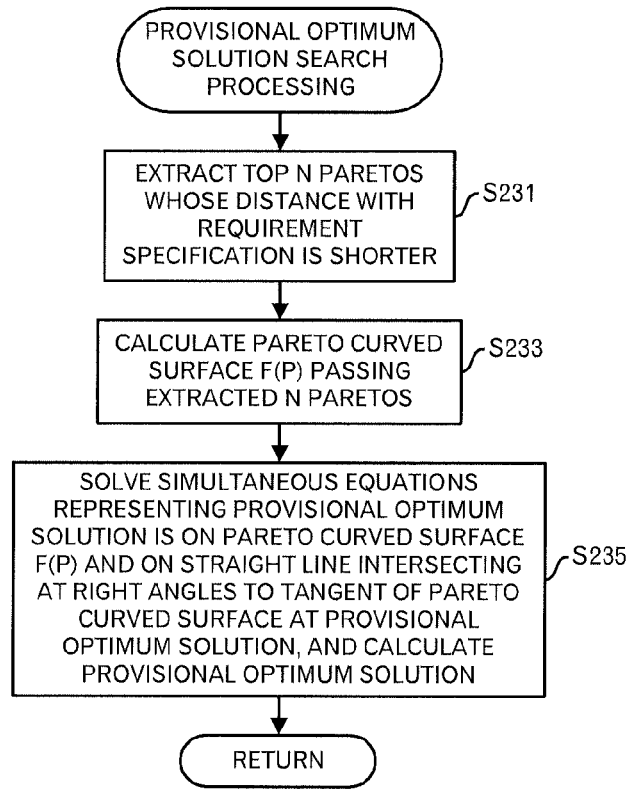
FIG. 33 is a diagram depicting a provisional optimum solution search processing.

First, the optimum solution generator 55 extracts top N pareto optimum solutions whose distance with the requirement solution is shorter, from among the pareto optimum solutions extracted at the step S203 (FIG. 33: step S231). Because the solutions after the space conversion are used, the distance is calculated by using the aforementioned expression (4). Then, the optimum solution generator 55 calculates a pareto curved surface F(P)=0 (in case of the two-dimensional space, a pareto curve) passing through the N extracted pareto optimum solutions by using a well-known method such as a method of least squares (step S233).

Then, the optimum solution generator 55 calculates the provisional optimum solution by solving simultaneous equations representing that the provisional optimum solution is on the pareto curved surface F(P)=0 and also on a straight line intersecting at right angles to a tangent of the pareto curve at the provisional optimum solution, and stores the provisional optimum solution into the storage device such as the main memory (step S235).

Figure 34:
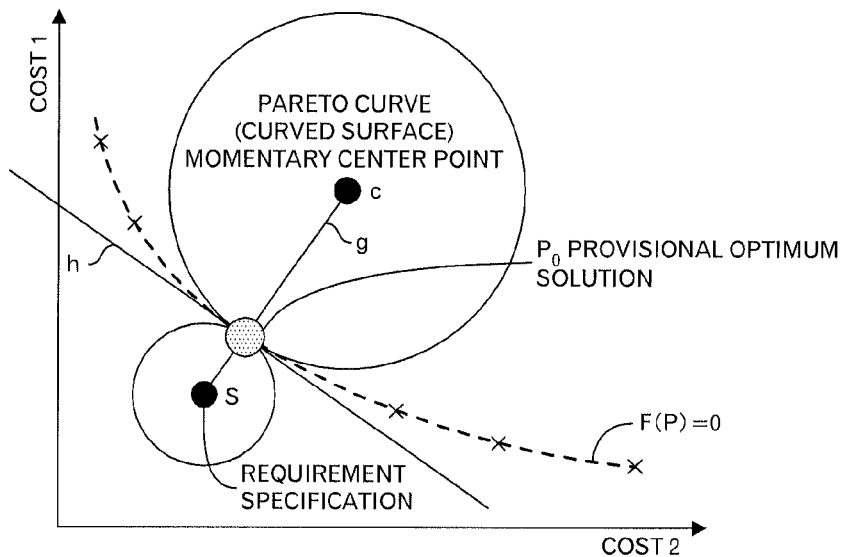
FIG. 34 is a diagram schematically depicting search of the provisional optimum solution.

The outline of this processing will be explained by using FIG. 34. As depicted in FIG. 34, when it is assumed that a curve passing the x pareto optimum solutions extracted at the step S203 is the pareto curve F(P), the provisional optimum solution $P_0$ is on the pareto curve F(P)=0. Namely, F($P_0$)=0 is satisfied. Furthermore, according to Collinearity theorem, the requirement specification S, the provisional optimum solution $P_0$ and the momentary center point of the pareto curve (generally, a curved surface) are on the same straight line. Namely, the provisional optimum solution $P_0$ and the requirement specification S are on the straight line g intersecting at right angles to a tangent h of the pareto curved surface at the provisional optimum solution $P_0$.

Specifically, the relations are represented by the following equations.

$$\begin{cases} P_o = -\nabla F(P)|_{P=P_o} \times t + Spec \\ F(P_o) = 0 \end{cases}$$

The first term in the right side of the first equation is a vector representing the straight line g, and "t" is an unknown coefficient, and Spec corresponds to the requirement specification S. Namely, the first equation represents the provisional optimum solution $P_0$ is obtained by multiplying the straight line g from the requirement specification S by "t". When such simultaneous equations are solved, "t" and the provisional optimum solution $P_0$ are obtained. Then, the processing returns to the calling-source processing.

Incidentally, possibility that the provisional optimum solution $P_0$ is different from the pareto optimum solutions stored in the solutions extracted at the step S203 is high. Therefore, a following confirmation processing is carried out.

Namely, the optimum solution generator 55 extracts the pareto optimum solutions close to the provisional optimum solution from among the pareto optimum solutions extracted at the step S203, and determines the circuit configuration of the provisional optimum solutions based on the circuit configuration of the close pareto optimum solutions (step S209). Schematically depicting a case of the two dimensional space in FIG. 35, when the provisional optimum solution $P_0$ is obtained from the requirement specification S, the optimum solution generator 55 extracts the pareto optimum solutions $P_1$ and $P_2$ close to the provisional optimum solution $P_0$ (here, both sides of the provisional optimum solution on the pareto curve). Then, the optimum solution generator 55 identifies identifiers of the circuit configurations from data extracted at the step S203 and associated with the pareto optimum solutions $P_1$ and $P_2$. At this time, when the same identifier is obtained for both of the pareto optimum solutions $P_1$ and $P_2$, this circuit configuration is adopted. On the other hand, when the different identifiers are obtained, the circuit configuration of the pareto optimum solution closest to the provisional pareto optimum solution is adopted.

Then, the optimum solution generator 55 carries out a reverse space conversion of the provisional optimum solution (step S211). The reverse conversion of the space conversion carried out at the step S205 is carried out. Specifically, an inverse vector of $V_{shift}$ is subtracted from $P_{Tran}$, and the result is further multiplied by an inverse matrix of $M_{scaling}$ from the left. This is because it is used at step S215.

Then, the optimum solution generator 55 determines values of the circuit parameters by mapping the provisional optimum solution to the variable space of the identified circuit configuration, and stores the values into the storage device such as the main memory (step S213).

Specifically, the optimum solution generator 55 selects the N pareto optimum solutions near the requirement specification, and calculates a relational expression f of the circuit parameters and the performance (the performance values after the space conversion) by using these selected pareto optimum solutions. Namely, $p_k = f_k (x1, x2, xn)$ is calculated. Here, "$p_k$" represents a performance value for the performance item k in the pareto optimum solution, and "xn" represents a value of the n-th circuit parameter in the pareto optimum solution. For example, "f" is calculated by fitting coefficients of the Taylor polynomial by using the method of least squares. Then, the circuit parameters $X=\{x1, x2, \ldots, xn\}$, which can realize the provisional optimum solution $P_0$ are calculated by using this expression $P=F(X)$. Incidentally, $P=\{p_1, \ldots, p_k\}$ and $F=\{f_1, \ldots, f_k\}$.

Explaining the final processing in detail, because the number k of the performance items is typically less than the number n of the circuit parameters, a set of x1, x2, ..., xn cannot be obtained even by simply substituting the provisional optimum solution $P_0$ into the simultaneous equations $F=\{f_1, f_2, \ldots, f_k\}$. Therefore, an optimization algorithm (e.g. a well-known Nelder-Mead method (See R. Fletcher, Practical Methods of Optimization, John Wiley & Sons, 1991.)) is used to solve approximate x1, x2, ..., xn, which can realize the provisional optimum solution. This processing is used, for example, in Japanese Laid-open Patent Publication No. 2004-61372. Therefore, any further explanation is omitted.

After that, the optimum solution generator 55 outputs to the circuit simulator 200, data of the circuit configuration identified at the step S209, data of the peripheral circuits for the identified circuit configuration, which is stored in the test bench data storage unit 13, and the values of the circuit parameters, which are calculated at the step S213, to cause the circuit simulator 200 to carry out the well-known circuit simulation, and obtains the performance values of the respective performance items in the requirement specification from the circuit simulator 200 (step S215). Then, the optimum solution generator 55 judges whether or not the provisional optimum solution after the reverse space conversion can be realized by the identified circuit configuration and circuit parameters (step S217). Namely, for each performance item in the requirement specification, the optimum solution generator 55 judges whether or not a value better than the value of the provisional optimum solution after the reverse space conversion is obtained in the circuit simulation. Namely, it is judged whether or not the cost lower than the cost of the provisional optimum solution after the reverse space conversion is obtained. The values of all of the performance items must be better than the corresponding performance values of the provisional optimum solution. Incidentally, the provisional optimum solution after the reverse space conversion is used, because the performance values of the provisional optimum solution should be compared with the results of the circuit simulation. When only comparing is executed, the results of the circuit simulation may be compared after the space conversion.

When the provisional optimum solution can be realized (step S217: Yes route), the optimum solution generator 55 stores the identified circuit configuration and design variable values (PVT parameter values may be added.) into the optimum solution data storage unit 57 (step S221). The provisional optimum solution after the reverse space conversion is also stored when it is compared with the requirement specification. Then, the output unit 59 outputs data of the optimum solution, which is stored in the optimum solution data storage unit 57, to an output device such as the display device or printer. The data includes the circuit configuration, design variable value set (PVT parameter value may be added), and in some case, the performance values of the respective performance items of the provisional optimum solution after the inverse space conversion. Thus, the user can obtain the circuit configuration to be employed, process constraint condition and design variable value set (PVT parameter value may be added). Incidentally, when the provisional optimum solution is outputted, it becomes possible to judge what is the relation with the requirement specification. For example, it is possible to judge whether or not the requirement specification is satisfied. The output unit 59 may judge whether or not the requirement specification is satisfied and output the judgment result.

Figure 35:
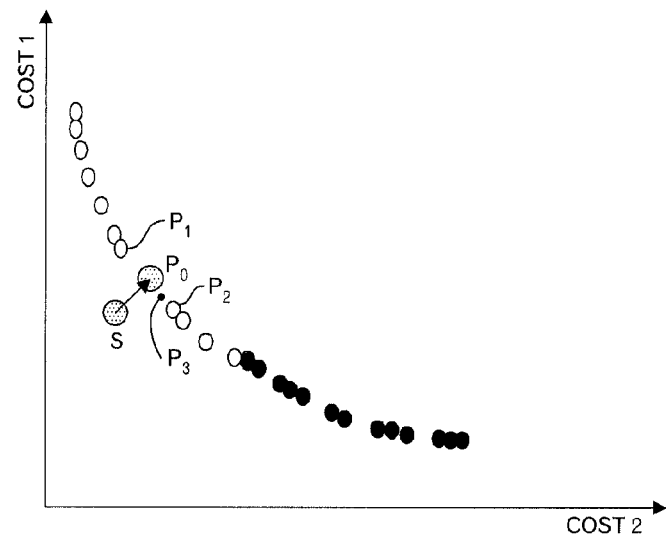
FIG. 35 is a schematic diagram to explain a processing to identify a circuit configuration corresponding to the provisional optimum solution.

On the other hand, when it is judged that the provisional optimum solution cannot be realized (step S217: No route), the optimum solution generator 55 extracts a next optimum solution in a range of the pareto optimum solutions close to the provisional optimum solution identified at the step S207, and further sets the circuit configuration of the pareto optimum solution nearest to the next optimum solution as the circuit configuration of the next optimum solution (step S219). In the example of FIG. 35, $P_3$ between the pareto optimum solutions $P_1$ and $P_2$ is identified. However, when no other solution cannot be found between the pareto optimum solutions $P_1$ and $P_2$, the pareto optimum solution $P_1$ or $P_2$ is adopted. After that, the processing returns to the step S211.

Incidentally, the steps S211 to S215 may be skipped because data extracted at the step S203 can be used as it is, when the provisional optimum solution is the pareto optimum solution.

By carrying out such a processing, because the automatic optimum circuit design apparatus carries out the circuit simulation whose processing time is longest, only at the step S215, the time consumed for the optimum circuit design can be largely reduced. In addition, even when it is judged at the step S217 that it is impossible to realize the requirement, it is possible to identify the circuit parameters for the solution (i.e. which substantially corresponds to the requirement specification after the change) nearer to the required values of the performance items in the requirement specification by utilizing the pareto optimum solutions, which have already been calculated, again. Therefore, the processing time can be shortened. In addition, because the solution satisfying the requirement of the yield rate is also obtained, it is expected that the intended result can be obtained in actual manufacturing.

Although the embodiments are described above, this technique is not limited to these embodiments. The aforementioned functional block diagrams are mere examples, and do not always correspond to actual program module configurations. In addition, as long as the processing result does not change, the order of the step in the processing flow may be changed or plural steps may be executed in parallel.

In addition, the number n of PVT parameter value sets to be generated may be fixed or may be dynamically changed. For example, when $p_s$ represents the number of populations (i.e. the number of design variable value sets), $r_s$ represents the number of ranks in the previous generation, and $N_m$ represents the predetermined maximum number of PVT parameter value sets, "n" maybe determined according to the following expression in the next generation.

$$n = \frac{\ln(p_s - r_s + 1)}{\ln(p_s)} \times N_m$$

Figure 36:
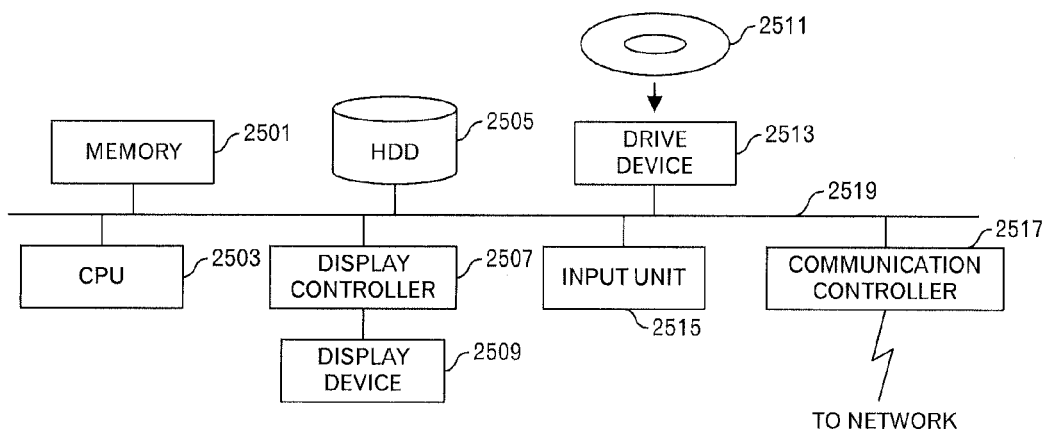
FIG. 36 is a functional block diagram of a computer.

In addition, the automatic circuit design support apparatus is a computer device as shown in FIG. 36. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 36. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 37:
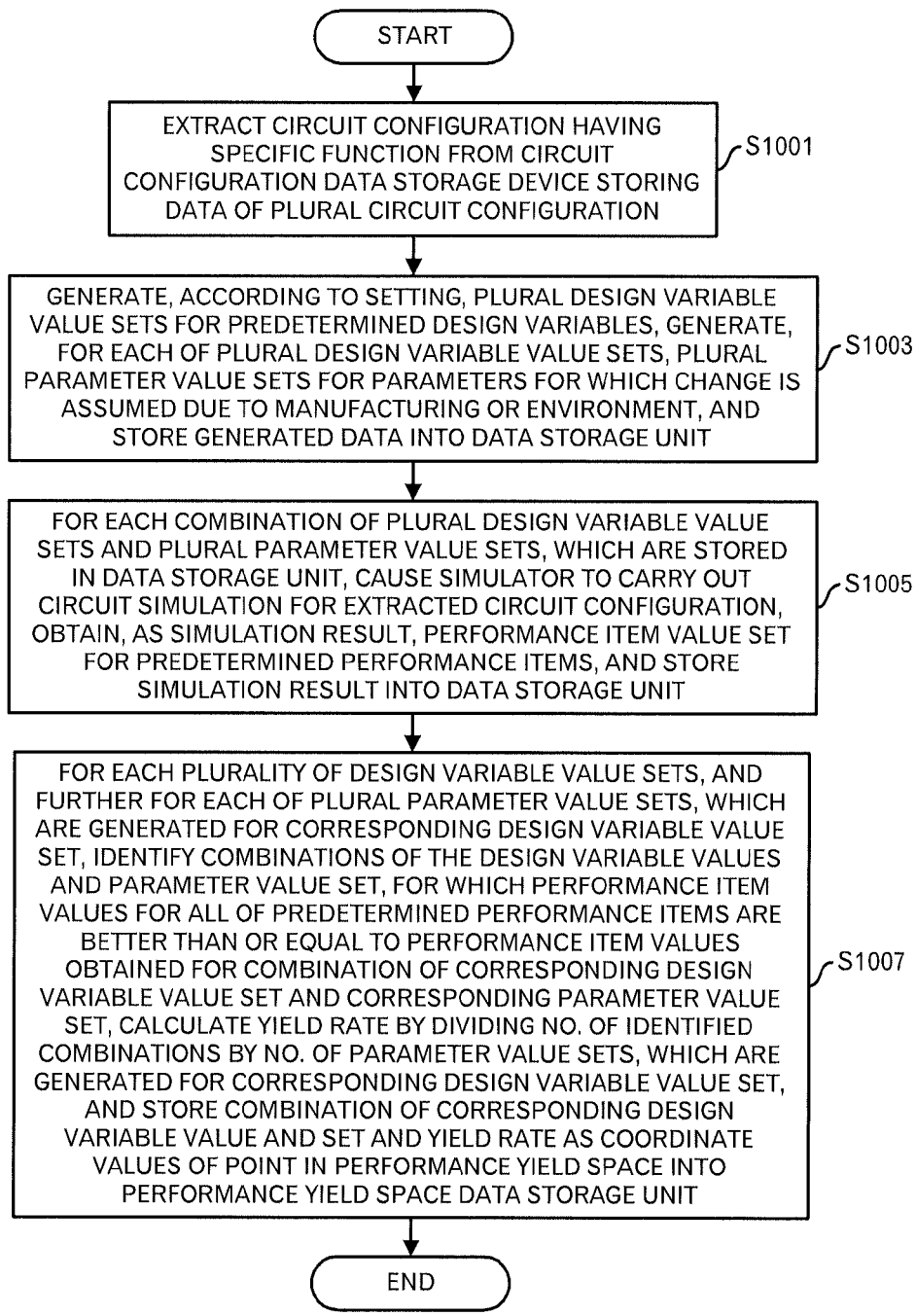
FIG. 37 is a diagram depicting a processing flow of an automatic design support method.

The aforementioned embodiments are outlined as follows:

An automatic design support method relating to the embodiments includes: (A) extracting a circuit configuration having a specific function from a circuit configuration data storage device storing data of a plurality of circuit configurations; (B) generating (e.g. step S1003 in FIG. 37), according to a setting, a plurality of design variable value sets for predetermined design variables, generating, for each of the plurality of design variable value sets, a plurality of parameter value sets for parameters for which change is assumed due to manufacturing or environment, and storing generated data into a data storage unit; (C) for each combination of one of the plurality of design variable value sets and one of the plurality of parameter value sets, which are stored in the data storage unit, causing (e.g. step S1005 in FIG. 37) a simulator to carry out a circuit simulation for the extracted circuit configuration, obtaining, as a simulation result, a performance item value set for predetermined performance items, and storing the simulation result into the data storage unit; and (D) for each of the plurality of design variable value sets, and further for each of the plurality of parameter value sets, which are generated for a corresponding design variable value set, identifying (e.g. step S1007 in FIG. 37) combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding design variable value set and the yield rate as coordinate values of a point in a performance yield space into a performance yield space data storage unit.

Thus, it becomes possible to appropriately evaluate the performance and yield rate.

The aforementioned automatic design support method may further include: (E) second extracting at least a top predetermined number of design surfaces by confirming domination relationships among a set of design surfaces, wherein each of the design surfaces is identified for each of the design variable value sets by coordinate values of points for a corresponding design variable value set, which are stored in the performance yield space data storage unit; and (F) identifying a set of points that are not dominated by the other points from a top predetermined number of design surfaces, and storing data of the set of points into a pareto data storage unit.

Incidentally, when all points belonging to a first design surface are dominated by any one of points belonging to a second design surface, it may be said that the second design surface dominates the first design surface. In addition, when all performance item values of a first point is equal to or better than corresponding performance item values of a second point, and the yield rate of the first point is equal to or greater than the yield rate of the second point, and at least one of the performance item values and the yield rate of the first and second points is not identical, it may be said that the first point dominates the second point.

By extracting a top predetermined number of design surfaces, it becomes possible to appropriately generate the design variable value sets in the next generation. Namely, it becomes possible to generate the design variable value sets enabling much higher performance. In addition, by generating data of the set of points, it becomes possible to identify, in a short time, the design variable value set, which is most suitable for the requirement specification, and the like.

Incidentally, the aforementioned second extracting may include: identifying non-dominated design surfaces that are design surfaces, which are not dominated by the other design surfaces, until the number of identified non-dominated design surfaces reaches at least a predetermined number, while removing the non-dominated design surface identified in advance from the set of design surfaces. Thus, by extracting the non-dominated design surfaces, it becomes easy to extract a top predetermined number of design surfaces.

Furthermore, the aforementioned second extracting may further include: sorting plural design surfaces identified just when the number of identified non-dominated design surfaces has reached the predetermined number, in descending order of the number of points that are included in each of the plural design surfaces and are not dominated by the other points of the plural design surfaces, to identify a top predetermined number of non-dominated design surfaces. By doing so, it becomes possible to appropriately extract just a top predetermined number of design surfaces.

Incidentally, the number of points whose yield rate is equal to or greater than a predetermined value may be counted. Thus, it is possible to extract appropriate design surfaces, after evaluating the yield rate in the meaningful range.

In addition, a top predetermined number of design surfaces may be stored in the performance yield space data storage unit and may be used to extract a new top predetermined number of design surfaces in a next generation. By using a top predetermined design surfaces for extracting a new top predetermined number of design surfaces in the next generation of the iteration in the processing in addition to for generating the design variable value sets in the next generation of the iteration in the processing, it becomes possible to transfer the much appropriate design surfaces to the next generation of the iteration in the processing.

In addition, the aforementioned method may further include: (G) extracting points corresponding to a designated yield rate included in a requirement specification from among the points whose coordinate values are stored in the pareto data storage unit, and storing the extracted points into a second pareto data storage unit; (H) calculating, as a provisional optimum solution, a point whose distance from a point corresponding to the requirement specification after space conversion of a performance item space to balance value distribution for the respective performance items in the requirement specification, is shortest and which is on a pareto surface of second points obtained after the space conversion is carried out for the coordinate values of the points stored in the second pareto data storage unit, in the performance item space after the space conversion; (I) extracting a second point close to said provisional optimum solution in the performance item space after the space conversion, from the second points, and identifying circuit configuration for the provisional optimum solution from the extracted point; and (J) mapping the provisional optimum solution to values of the respective predetermined design variables in the identified circuit configuration.

When data is prepared in the pareto data storage unit, it becomes possible to quickly obtain the optimum values of the design variable according to the requirement specification by carrying out such a processing.

Figure 38:
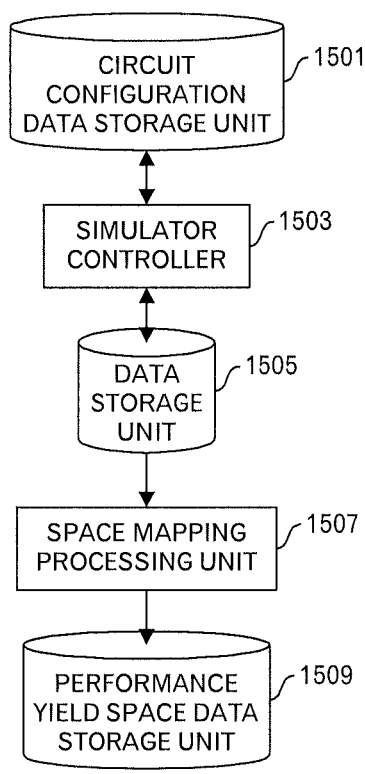
FIG. 38 is a functional block diagram of an optimization support apparatus.

An optimization support apparatus (FIG. 38) relating to the embodiments includes: a circuit configuration data storage unit (1501 in FIG. 38) storing data of the circuit configuration; a simulator controller (1503 in FIG. 38) to extract a circuit configuration having a specific function from the circuit configuration data storage unit, to generate, according to a setting, a plurality of design variable value sets for predetermined design variables, to generate, for each of the plurality of design variable value sets, a plurality of parameter value sets for parameters for which change is assumed due to manufacturing or environment, and store generated data into a data storage unit (1505 in FIG. 38); and for each combination of one of the plurality of design variable value sets and one of the plurality of parameter value sets, which are stored in the data storage unit, to cause a simulator to carry out a circuit simulation for the extracted circuit configuration, to obtain, as a simulation result, a performance item value set for predetermined performance items, and to store the simulation result into the data storage unit; and a space mapping processing unit (1507 in FIG. 38) to carry out a processing comprising, for each of the plurality of design variable value sets, and further for each of the plurality of parameter value sets, which are generated for a corresponding design variable value set, identifying combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding design variable value set and the yield rate as coordinate values of a point in a performance yield space into a performance yield space data storage unit (1509 in FIG. 38).

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory medium storing a program for causing a computer to execute an optimization support process, the process comprising:

extracting a circuit configuration having a specific function from a circuit configuration data storage unit storing data of the circuit configuration;

generating, according to a setting, a plurality of design variable value sets for predetermined design variables, generating, for each of the plurality of design variable value sets, a plurality of parameter value sets for parameters for which change is assumed due to manufacturing or environment, and storing generated data into a data storage unit;

for each combination of one of the plurality of design variable value sets and one of the plurality of parameter value sets, which are stored in the data storage unit, causing a simulator to carry out a circuit simulation for the extracted circuit configuration, obtaining, as a simulation result, a performance item value set for predetermined performance items, and storing the simulation result into the data storage unit;

for each of the plurality of design variable value sets, and further for each of the plurality of parameter value sets, which are generated for a corresponding design variable value set, identifying combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding performance item values and the yield rate as coordinate values of a point in a performance yield space and the corresponding design variable value set into a performance yield space data storage unit;

second extracting at least a top predetermined number of design surfaces by confirming domination relationships among a set of design surfaces, wherein each of the design surfaces is identified for each of the design variable value sets by coordinate values of points for a corresponding design variable value set, which are stored in the performance yield space data storage unit; and identifying a set of points that are not dominated by the other points from said top predetermined number of design surfaces, and storing data of the set of points into a pareto data storage unit, and wherein, when all points belonging to a first design surface are dominated by any one of points belonging to a second design surface, the second design surface dominates the first design surface, when all performance item values of a first point is equal to or better than corresponding performance item values of a second point, and the yield rate of the first point is equal to or greater than the yield rate of the second point, and at least one of the performance item values and the yield rate of the first and second points is not identical, the first point dominates the second point, and the second extracting comprises:

identifying non-dominated design surfaces that are design surfaces, which are not dominated by the other design surfaces, until the number of identified non-dominated design surfaces reaches at least a predetermined number, while removing the non-dominated design surface identified in advance from the set of design surfaces; and sorting plural design surfaces identified when the number of identified non-dominated design surfaces has reached the predetermined number, in descending order of the number of points that are included in each of the plural design surfaces and are not dominated by the other points of the plural design surfaces, to identify a top predetermined number of non-dominated design surfaces.

2. The computer-readable, non-transitory medium as set forth in claim 1, wherein the number of points whose yield rate is equal to or greater than a predetermined value is counted.

3. The computer-readable, non-transitory medium as set forth in claim 1, wherein the top predetermined number of design surfaces is stored in the performance yield space data storage unit and used to extract a new top predetermined number of design surfaces in a next generation.

4. The computer-readable, non-transitory medium as set forth in claim 1, wherein the process further comprises:

extracting points corresponding to a designated yield rate included in a requirement specification from among the points whose coordinate values are stored in the pareto data storage unit, and storing the extracted points into a second pareto data storage unit;

calculating, as a provisional optimum solution, a point whose distance from a point corresponding to the requirement specification after space conversion of a performance item space to balance value distribution for the respective performance items in the requirement specification, is shortest and which is on a pareto surface of second points obtained after the space conversion is carried out for the coordinate values of the points stored in the second pareto data storage unit, in the performance item space after the space conversion;

extracting a second point close to said provisional optimum solution in the performance item space after the space conversion, from the second points, and identifying circuit configuration for the provisional optimum solution from the extracted point; and mapping the provisional optimum solution to values of the respective predetermined design variables in the identified circuit configuration.

5. An optimization support method comprising:

extracting, by using a computer, a circuit configuration having a specific function from a circuit configuration data storage unit storing, by using the computer, data of the circuit configuration;

generating, by using the computer and according to a setting, a plurality of design variable value sets for predetermined design variables, generating, by using the computer and for each of the plurality of design variable value sets, a plurality of parameter value sets for parameters for which change is assumed due to manufacturing or environment, and storing, by using the computer, generated data into a data storage unit;

for each combination of one of the plurality of design variable value sets and one of the plurality of parameter value sets, which are stored in the data storage unit, causing a simulator to carry out a circuit simulation for the extracted circuit configuration, obtaining, by using the computer and as a simulation result, a performance item value set for predetermined performance items, and storing, by using the computer, the simulation result into the data storage unit;

for each of the plurality of design variable value sets, and further for each of the plurality of parameter value sets, which are generated for a corresponding design variable value set, identifying, by using the computer, combinations of the design variable value set and the parameter value set, for which performance item values for all of the predetermined performance items are better than or equal to corresponding performance item values obtained for a combination of the corresponding design variable value set and a corresponding parameter value set, calculating, by using the computer, a yield rate by dividing the number of identified combinations by the number of parameter value sets, which are generated for the corresponding design variable value set, and storing, by using the computer, a combination of the corresponding performance item values and the yield rate as coordinate values of a point in a performance yield space and the corresponding design variable value set into a performance yield space data storage unit;

second extracting, by using the computer, at least a top predetermined number of design surfaces by confirming domination relationships among a set of design surfaces, wherein each of the design surfaces is identified for each of the design variable value sets by coordinate values of points for a corresponding design variable value set, which are stored in the performance yield space data storage unit; and identifying, by using the computer, a set of points that are not dominated by the other points from said top predetermined number of design surfaces, and storing data of the set of points into a pareto data storage unit, and wherein, when all points belonging to a first design surface are dominated by any one of points belonging to a second design surface, the second design surface dominates the first design surface, when all performance item values of a first point is equal to or better than corresponding performance item values of a second point, and the yield rate of the first point is equal to or greater than the yield rate of the second point, and at least one of the performance item values and the yield rate of the first and second points is not identical, the first point dominates the second point, and the second extracting comprises:

identifying non-dominated design surfaces that are design surfaces, which are not dominated by the other design surfaces, until the number of identified non-dominated design surfaces reaches at least a predetermined number, while removing the non-dominated design surface identified in advance from the set of design surfaces; and sorting plural design surfaces identified when the number of identified non-dominated design surfaces has reached the predetermined number, in descending order of the number of points that are included in each of the plural design surfaces and are not dominated by the other points of the plural design surfaces, to identify a top predetermined number of non-dominated design surfaces.

6. An optimization support apparatus comprising:

a circuit configuration data storage unit storing data of the circuit configuration;

a simulator controller to extract a circuit configuration having a specific function from the circuit configuration data storage unit, to generate, according to a setting, a plurality of design variable value sets for predetermined design variables, to generate, for each of the plurality of design variable value sets, a plurality of parameter value sets for parameters for which change is assumed due to manufacturing or environment, and store generated data into a data storage unit, and for each combination of one of the plurality of design variable value sets and one of the plurality of parameter value sets, which are stored in the data storage unit, to cause a simulator to carry out a circuit simulation for the extracted circuit configuration, to obtain, as a simulation result, a performance item value set for predetermined performance items, and to store the simulation result into the data storage unit;

a space mapping processing unit to carry out a processing comprising, for each of the plurality of design variable value sets, and further for each of the plurality of parameter value sets, which are generated for a corresponding design variable value set, identifying combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding performance item values and the yield rate as coordinate values of a point in a performance yield space and the corresponding design variable value set into a performance yield space data storage unit;

an extracting unit that to extract at least a top predetermined number of design surfaces by confirming domination relationships among a set of design surfaces, wherein each of the design surfaces is identified for each of the design variable value sets by coordinate values of points for a corresponding design variable value set, which are stored in the performance yield space data storage unit; and an identifying unit to identify a set of points that are not dominated by the other points from said top predetermined number of design surfaces, and store data of the set of points into a pareto data storage unit, and wherein, when all points belonging to a first design surface are dominated by any one of points belonging to a second design surface, the second design surface dominates the first design surface, when all performance item values of a first point is equal to or better than corresponding performance item values of a second point, and the yield rate of the first point is equal to or greater than the yield rate of the second point, and at least one of the performance item values and the yield rate of the first and second points is not identical, the first point dominates the second point, and the extracting unit identifies non-dominated design surfaces that are design surfaces, which are not dominated by the other design surfaces, until the number of identified non-dominated design surfaces reaches at least a predetermined number, while removing the non-dominated design surface identified in advance from the set of design surfaces, and sorts plural design surfaces identified when the number of identified non-dominated design surfaces has reached the predetermined number, in descending order of the number of points that are included in each of the plural design surfaces and are not dominated by the other points of the plural design surfaces, to identify a top predetermined number of non-dominated design surfaces.

7. An optimization support apparatus, comprising:

a memory configured to store data of the circuit configuration; and a processor configured to execute a process, the process comprising:

extracting a circuit configuration having a specific function from the memory;

generating, according to a setting, a plurality of design variable value sets for predetermined design variables, generating, for each of the plurality of design variable value sets, a plurality of parameter value sets for parameters for which change is assumed due to manufacturing or environment, and storing generated data into the memory;

for each combination of one of the plurality of design variable value sets and one of the plurality of parameter value sets, which are stored in the memory, causing a simulator to carry out a circuit simulation for the extracted circuit configuration, obtaining, as a simulation result, a performance item value set for predetermined performance items, and storing the simulation result into the memory;

for each of the plurality of design variable value sets, and further for each of the plurality of parameter value sets, which are generated for a corresponding design variable value set, identifying combinations of the design variable value set and the parameter value set, for which performance item values for all of the predetermined performance items are better than or equal to corresponding performance item values obtained for a combination of the corresponding design variable value set and a corresponding parameter value set, calculating a yield rate by dividing the number of identified combinations by the number of parameter value sets, which are generated for the corresponding design variable value set, and storing a combination of the corresponding performance item values and the yield rate as coordinate values of a point in a performance yield space and the corresponding design variable value set into the memory;

second extracting at least a top predetermined number of design surfaces by confirming domination relationships among a set of design surfaces, wherein each of the design surfaces is identified for each of the design variable value sets by coordinate values of points for a corresponding design variable value set, which are stored in the performance yield space data storage unit; and identifying a set of points that are not dominated by the other points from said top predetermined number of design surfaces, and storing data of the set of points into a pareto data storage unit, and wherein, when all points belonging to a first design surface are dominated by any one of points belonging to a second design surface, the second design surface dominates the first design surface, when all performance item values of a first point is equal to or better than corresponding performance item values of a second point, and the yield rate of the first point is equal to or greater than the yield rate of the second point, and at least one of the performance item values and the yield rate of the first and second points is not identical, the first point dominates the second point, and the second extracting comprises:

identifying non-dominated design surfaces that are design surfaces, which are not dominated by the other design surfaces, until the number of identified non-dominated design surfaces reaches at least a predetermined number, while removing the non-dominated design surface identified in advance from the set of design surfaces; and sorting plural design surfaces identified when the number of identified non-dominated design surfaces has reached the predetermined number, in descending order of the number of points that are included in each of the plural design surfaces and are not dominated by the other points of the plural design surfaces, to identify a top predetermined number of non-dominated design surfaces.

* * * * *